US008515083B2

(12) United States Patent
Villemoes et al.

(10) Patent No.: US 8,515,083 B2
(45) **Date of Patent: *Aug. 20, 2013**

(54) METHODS FOR IMPROVED PERFORMANCE OF PREDICTION BASED MULTI-CHANNEL RECONSTRUCTION

(75) Inventors: Lars Villemoes, Stockholm (SE); Kristofer Kjoerling, Stockholm (SE); Heiko Purnhagen, Stockholm (SE); Jonas Roeden, Stockholm (SE); Jeroen Breebaart, Eindhoven (NL); Gerard Hotho, Eindhoven (NL)

(73) Assignees: Dolby International AB, Amsterdam Zuid-Oost (NL); Koninklijke Philips Electronics N.V., Eindhoven (NL)

( * ) Notice: Subject to any disclaimer, the term of this patent is extended or adjusted under 35 U.S.C. 154(b) by 2017 days.

This patent is subject to a terminal disclaimer.

(21) Appl. No.: 11/290,370

(22) Filed: Nov. 29, 2005

(65) Prior Publication Data

US 2006/0165237 A1 Jul. 27, 2006

Related U.S. Application Data

(63) Continuation of application No. PCT/EP2005/011586, filed on Oct. 28, 2005.

(30) Foreign Application Priority Data

Nov. 2, 2004 (SE) ........................................ 0402652

(51) Int. Cl.

*H04R 5/00* (2006.01)
*G06F 17/00* (2006.01)
*G10L 19/00* (2013.01)

(52) U.S. Cl.

USPC .................. 381/23; 381/22; 700/94; 704/500

(58) Field of Classification Search

USPC ........................ 381/119, 19–23, 1–2; 700/94; 704/500–501; 369/4

See application file for complete search history.

(56) References Cited

U.S. PATENT DOCUMENTS 4,744,044 A * 5/1988 Stover et al. .................. 708/530
5,706,309 A 1/1998 Eberlein et al.

(Continued)

FOREIGN PATENT DOCUMENTS

EP 1 376 538 A 1/2004
EP 1376538 1/2004

(Continued)

OTHER PUBLICATIONS

Ten Kate, W. Compatibility Matrixing of Multichannel Bit-Rate-Reduced Audio Signals. Journal of the Audio Engineering Society. Audio Engineering Society. New York. vol. 44. No. 12. Dec. 1996.

(Continued)

*Primary Examiner* — Vivian Chin
*Assistant Examiner* — Douglas Suthers
(74) *Attorney, Agent, or Firm* — Michael A. Glenn; Perkins Coie LLP

(57) ABSTRACT

For a multi-channel reconstruction of audio signals based on at least one base channel, an energy measure is used for compensating energy losses due to an predictive upmix. The energy measure can be applied in the encoder or the decoder. Furthermore, a decorrelated signal is added to output channels generated by an energy-loss introducing upmix procedure. The energy of the decorrelated signal is smaller than or equal to an energy error introduced by the predictive upmix. Thus, problems occurring for prediction based up-mix methods such as up-mixing signals that are coded with High Frequency Reconstruction techniques are solved, so that the correct correlation between the up-mixed channels is obtained or the up-mix is adapted to arbitrary down-mixes.

50 Claims, 18 Drawing Sheets

(56) References Cited

U.S. PATENT DOCUMENTS

| | | | | |
|---|---|---|---|---|
| 5,890,125 | A * | 3/1999 | Davis et al. | 704/501 |
| 6,680,972 | B1 * | 1/2004 | Liljeryd et al. | 375/240 |
| 7,292,901 | B2 | 11/2007 | Baumgarte et al. | |
| 7,627,482 | B2 | 12/2009 | Tsuji et al. | |
| 7,853,022 | B2 * | 12/2010 | Thompson et al. | 381/17 |
| 2002/0067834 | A1 | 6/2002 | Shirayanagi | |
| 2003/0235317 | A1 * | 12/2003 | Baumgarte | 381/119 |
| 2005/0078832 | A1 | 4/2005 | Van De Par et al. | |

FOREIGN PATENT DOCUMENTS

| | | |
|---|---|---|
| JP | 2002-175097 | 6/2002 |
| JP | 2003-337598 | 11/2003 |
| JP | 2004-078183 | 3/2004 |
| WO | WO 98/57436 | 12/1998 |
| WO | WO 2005/036925 | 4/2005 |
| WO | WO 2005/086139 A | 9/2005 |

OTHER PUBLICATIONS

Szczerba, et al. Matrized Multi-Channel Extension for AAC Codec. Audio Engineering Society Convention Paper. Mar. 22, 2003.

Herre, et al. Spatial Audio Coding:Next-Generation Efficient and Compatible Coding of Multi-Channel Audio. Audio Engineering Society Convention Paper. New York. Oct. 28, 2004.

Faller, C. Parametric Coding of Spatial Audio. Thesis No. 3062. Ecole Polytechnique Federale de Lausanne. Sep. 24, 2004.

Breebaart J., et al. MPEG Spatial Audio Coding/MPEG Surround: Overview and Current Status. Audio Engineering Society Convention Paper. 119th AES Convention. Oct. 7, 2005.

Russian Decision to Grant dated Apr. 2, 2009, with English translation, 30 pages.

* cited by examiner $$g_z = \sqrt{1 + v_z^2((1-\rho^2)/\rho^2)\,\hat{E}/\|\hat{Z}\|^2}$$
$z = l, r, c$

| No. | energy compensation method |
|---|---|
| 1 | decoder-side/ subsequent to upmix (Fig. 2) |
| 2 | encoder-side/ subsequent to downmix (Fig. 4) |
| 3 | decoder-side/ before upmix |
| 4 | encoder-side/ before downmix |
| 5 | no scaling, but addition of controlled amount of decorr. Signal (Fig. 5) |
| 6 | partly scaling, energy remainder is filled up with decorr. Signal (Fig. 7) |
| 8 | decorr. Signal is derived from base channel(s) (-> Nos. 5, 6) |

Fig. 13

| ID | SUBBAND | parameters |
|---|---|---|
| P | 1 | predictive Fig14a |
| P | 2 | predictive Fig14a |
| . | . | . |
| . | . | . |
| . | . | . |
| P | i | predictive Fig14a |
| E | i+1 | energy style Fig. 15a |
| . | . | . |
| . | . | . |
| . | . | . |
| E | N | energy style Fig. 15a |

low Band (subbands 1 to i)

high band (subbands i+1 to N)

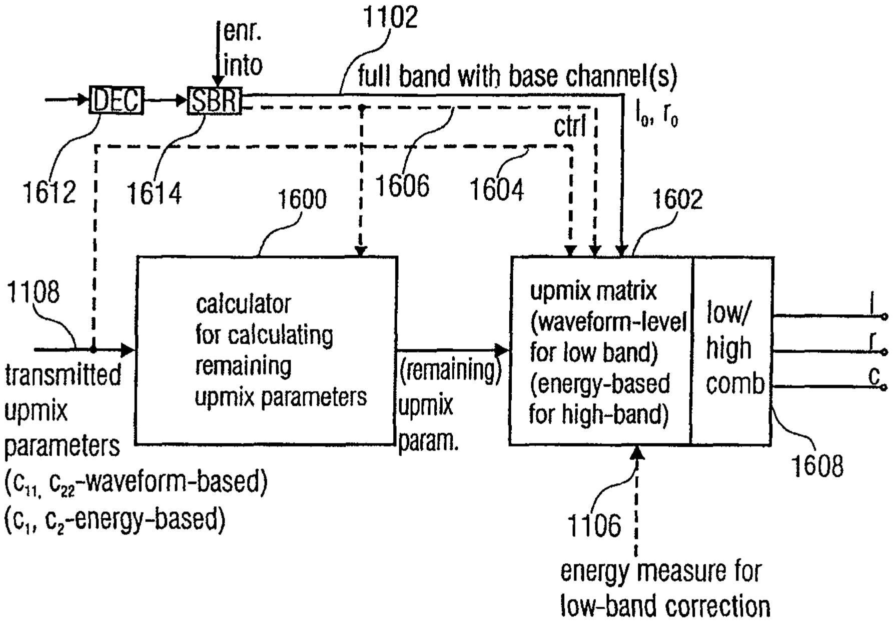

Fig. 16a $$\underbrace{\begin{bmatrix}\alpha_1 & \alpha_2 & \alpha_3\\ \beta_1 & \beta_2 & \beta_3\end{bmatrix}}_{D} * \underbrace{\begin{bmatrix}c_{11} & c_{12}\\ c_{12} & c_{22}\\ c_{31} & c_{32}\end{bmatrix}}_{C} = \underbrace{\begin{bmatrix}1 & 0\\ 0 & 1\end{bmatrix}}_{I}$$

D: six variables (predetermined and known to the decoder)

C: - two parameters (e.g. c11, c22) transmitted
- four parameters (e.g. c12, c21, c31, c32) calculated by calculator in Fig. 16a using four equations derived from above matrix equation (waveform-based)

Fig. 16b

METHODS FOR IMPROVED PERFORMANCE OF PREDICTION BASED MULTI-CHANNEL RECONSTRUCTION

CROSS-REFERENCE TO RELATED APPLICATION

This application is a continuation of copending International Application No. PCT/EP2005/011586, filed Oct. 28, 2005, which designated the United States, and was not published in English and is incorporated herein by reference in its entirety.

BACKGROUND OF THE INVENTION

1. Field of the Invention

The present invention relates to multi-channel reconstruction of audio signals based on an available stereo signal and additional control data.

2. Description of Prior Art

Recent development in audio coding has made available the ability to recreate a multi-channel representation of an audio signal based on a stereo (or mono) signal and corresponding control data. These methods differ substantially from older matrix based solution such as Dolby Prologic, since additional control data is transmitted to control the re-creation, also referred to as up-mix, of the surround channels based on the transmitted mono or stereo channels.

Hence, the parametric multi-channel audio decoders reconstruct N channels based on M transmitted channels, where N>M, and the additional control data. The additional control data represents a significant lower data rate than transmitting the additional N-M channels, making the coding very efficient while at the same time ensuring compatibility with both M channel devices and N channel devices.

These parametric surround coding methods usually comprise a parameterisation of the surround signal based on IID (Inter channel Intensity Difference) and ICC (Inter Channel Coherence). These parameters describe power ratios and correlation between channel pairs in the up-mix process. Further parameters also used in prior art comprise prediction parameters used to predict intermediate or output channels during the up-mix procedure.

One of the most appealing usage of prediction based method as described in prior art is for a system that re-creates 5.1 channel from two transmitted channels. In this configuration a stereo transmission is available at the decoder side, which is a downmix of the original 5.1 multichannel signal. In this context it is particularly interesting to be able to as accurately as possible extract the center channel from the stereo signal, since the center channel is usually downmixed to both the left and the right downmix channel. This is done by means of estimating two prediction coefficients describing the amount of each of the two transmitted channels used to build the center channel. These parameters are estimated for different frequency regions similarly to the IID and ICC parameters above.

However, since the prediction parameters do not describe a power ratio of two signals, but are based on wave-form matching in a least square error sense, the method becomes inherently sensitive to any modification of the stereo waveform after the calculation of the prediction parameters.

Further developments in audio coding over the recent years has introduced High Frequency Reconstruction methods as a very useful tool in audio codecs at low bitrates. One example is SBR (Spectral Band Replication) [WO 98/57436], that is used in MPEG standardized codecs such as MPEG-4 High Efficiency AAC. Common for these methods are that they re-create the high frequencies on the decoder side from a narrow-band signal coded by the underlying core-codec and a small amount of additional guidance information. Similar to the case of the parametric reconstruction of multi-channel signals based on one or two channels, the amount of control data required to re-create the missing signal components (in the case of SBR, the high frequencies), is significantly smaller than the amount of data that would be required to code the entire signal with a wave-form codec.

It should be understood however, that the re-created highband signal, is perceptually equal to the original highband signal, while the actual wave-form differs significantly. Furthermore, for wave-form coders coding stereo signals at low bitrate stereo pre-processing is commonly used, which means that a limitation on the side signal of the mid/side representation of the stereo signal is performed.

When a multi-channel representation is desired based on a stereo codec signal using MPEG-4 High Efficiency AAC or any other codec utilising high frequency reconstruction techniques, these and other aspects of the codec used to code the down-mixed stereo signal must be considered.

Even further, it is common that for a recording available as a multi-channel audio signal there is a dedicated stereo mix available, that is not an automated down-mix version of the multi-channel signal. This is commonly referred to as "artistic down-mix". This down-mix cannot be expressed as a linear combination of the multi-channel signals.

SUMMARY OF THE INVENTION

It is an object of the present invention to provide an improved multi-channel down-mix/encoder or up-mix/decoder concept, which results in a better quality reconstructed multi-channel output.

In accordance with a first aspect, the invention provides a multi-channel synthesizer for generating at least three output channels using an input signal having at least one base channel, the base channel being derived from the original multi-channel signal, having:

an up-mixer for up-mixing the at least one base channel based on an energy-loss introducing up-mixing rule so that the at least three output channels are obtained, wherein the up-mixer is operative to generate the at least three output channels in response to an energy measure and at least two different up-mixing parameters so that the at least three output channels have an energy higher than an energy of a signal obtained by only using the energy-loss introducing up-mixing rule instead of an energy error, the energy error depending on the energy-loss introducing up-mixing rule, and wherein the at least two different up-mixing parameters and the energy measure for controlling the up-mixer are included in the input signal.

In accordance with a second aspect, the invention provides an encoder for processing a multi-channel input signal, having an energy measure calculator for calculating an energy measure depending on an energy difference between a multi-channel input signal or an at least one base channel derived from the multi-channel input signal and an up-mixed signal generated by an energy-loss introducing up-mixing operation; and an output interface for outputting the at least one base channel after being scaled by a scaling factor dependent on the energy measure or for outputting the energy measure.

In accordance with a third aspect, the invention provides a method of generating at least three output channels using an input signal having at least one base channel, the base channel being derived from the original multi-channel signal, the method including the steps of:

up-mixing the at least one base channel based on an energy-loss introducing up-mixing rule so that the at least three output channels are obtained, wherein, in the step of upmixing, the at least three output channels are generated in response to an energy measure and at least two different up-mixing parameters so that the at least three output channels have an energy higher than an energy of a signal obtained by only using the energy-loss introducing up-mixing rule instead of an energy error, the energy error depending on the energy-loss introducing up-mixing rule, and wherein the at least two different up-mixing parameters and the energy measure for controlling the up-mixer are included in the input signal.

In accordance with a fourth aspect, the invention provides a method of processing a multi-channel input signal, the method including the steps of:

calculating an error measure depending on an energy difference between a multi-channel input signal or an at least one base channel derived from the multi-channel input signal and an up-mixed signal generated by an energy-loss introducing up-mixing operation; and outputting the at least one base channel after being scaled by a scaling factor dependent on the energy measure or outputting the energy measure.

In accordance with a fifth aspect, the invention provides an encoded multi-channel information signal having at least one base channel scaled by an energy measure depending on an energy difference between a multi-channel input signal or an at least one base channel derived from the multi-channel input signal and an up-mixed signal generated by an energy-loss introducing up-mixing operation or having the energy measure or for outputting the energy measure.

In accordance with a sixth aspect, the invention provides a machine-readable medium having stored thereon an encoded multi-channel information signal having at least one base channel scaled by an energy measure depending on an energy difference between a multi-channel input signal or an at least one base channel derived from the multi-channel input signal and an up-mixed signal generated by an energy-loss introducing up-mixing operation or having the energy measure or for outputting the energy measure.

The present invention relates to the problem of waveform modification of the down mixed multi-channel signal when prediction based up-mix methods are used. This includes when the down-mixed signal is coded by a codec performing stereo-pre-processing, high frequency reconstruction and other coding schemes that significantly modifies the waveform. Furthermore, the invention addresses the problem that arises when using predictive up-mix techniques for an artistic down-mix, i.e. a down-mix signal that is not automated from the multi-channel signal.

The present invention comprises the following features:

Estimation of the prediction parameters based on the modified wave-form instead of the downmixed waveform;

Using of prediction based methods only in the frequency ranges where it is advantageous;

Correction of the energy loss and inaccurate correlation between channels introduced in the prediction based up-mix procedure.

BRIEF DESCRIPTION OF THE DRAWINGS

The present invention will now be described by way of illustrative examples, not limiting the scope or spirit of the invention, with reference to the accompanying drawings, in which:

FIG. 13 a Table of preferred energy compensation methods;

FIG. 16*a* an inventive decoder illustrating the calculation of up-mix matrix coefficients;

FIG. 16*b* a detailed description of parameter calculation for the predictive up-mix;

DESCRIPTION OF PREFERRED EMBODIMENTS

Figure 1:
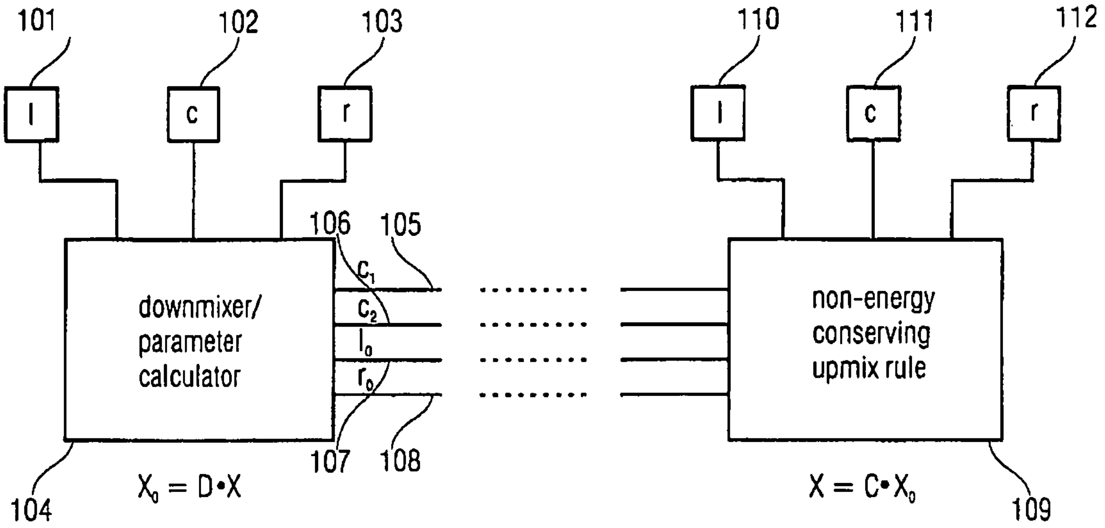
(Prior Art) Fig. 1
FIG. 1 illustrates a prediction based reconstruction of three channels from two channels.

The below-described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

It is emphasized that subsequent parameter calculation, application, upmixing, downmixing or any other actions can be performed on a frequency band selective base, i.e. for subbands in a filterbank.

In order to outline the advantages of the present invention a more detailed description of a predictive upmix as known by prior art is given first. Let's assume a three channel upmix based on two downmix channels, as outlined in FIG. 1, where 101 represents the left original channel, 102 represents the center original channel, 103 represents the right original channel, 104 represents the down-mix and parameter extraction module on the encoder side, 105 and 106 represents prediction parameters, 107 represents the left down-mixed channel, 108 represents the right downmixed channel, 109 represents the predictive upmix module, and 110, 111 and 112 represents the reconstructed left, center, and right channel respectively.

Assume the following definitions where X is a 3×L matrix containing the three signal segments l(k), r(k), c(k), k=0, . . . ,L−1 as rows.

Likewise, let the two downmixed signals $l_0(k)$, $r_0(k)$ form the rows of $X_0$. The downmix process is described by $$X_0=DX \tag{1}$$

where the downmix matrix is defined by $$D=\begin{pmatrix}\alpha_1 & \alpha_2 & \alpha_3\\ \beta_1 & \beta_2 & \beta_3\end{pmatrix} \tag{2}$$

A preferred choice of downmix matrix is $$D_\alpha=\begin{pmatrix}1 & 0 & \alpha\\ 0 & 1 & \alpha\end{pmatrix} \tag{3}$$

which means that the left downmix signal $l_0(k)$ will contain only l(k) and αc(k), and $r_0(k)$ will contain only r(k) and αc(k). This downmix matrix is preferred since it assigns an equal amount of the center channel to the left and right downmix, and since it does not assign any of the original right channel to the left downmix or vice versa.

The upmix is defined by $$\hat{X}=CX_0 \tag{4}$$

where C is a 3×2 upmix matrix.

The predictive upmix as known from prior art relies on the idea of solving the overdetermined system $$CX_0=X \tag{5}$$

for C in the least squares sense. This leads to the normal equations $$CX_0X^*_0=XX^*_0 \tag{6}$$

Multiplying (6) from the left with D gives $DCX_0X^*_0=X_0X^*_0$, which, in the generic case where $X_0X_0^*=DXX^*D^*$ is non-singular, implies $$DC=I_2 \tag{7}$$

where, $I_n$, denotes the n identity matrix. This relation reduces the parameter space C to dimension two.

Given the above, the upmix matrix $$C=\begin{pmatrix}c_{11} & c_{12}\\ c_{21} & c_{22}\\ c_{31} & c_{32}\end{pmatrix}$$

can be completely defined on the decoder side if the downmix matrix D is known, and two elements of the C matrix are transmitted, e.g. $c_{11}$ and $c_{22}$.

The residual (prediction error) signals are given by $$X_r=X-\hat{X}=(I_3-CD)X \tag{8}$$

Multiplying from the left with D yields $$DX_r=(D-DCD)X=0 \tag{9}$$

due to (7). It follows that there is a 1×L row vector signal $x_r$ such that $$X_r=vx_r \tag{10}$$

where v is a 3×1 unit vector spanning the kernel (null space) of D. For instance, in the case of downmix (3), one can use $$v=\frac{1}{\sqrt{1+2\alpha^2}}\begin{bmatrix}-\alpha\\ -\alpha\\ 1\end{bmatrix} \tag{11}$$

In general, when $v=[v_l, v_r, v_c]^T$, and the $\hat{X}=[\hat{l}(k), \hat{r}(k), \hat{c}(k)]^T$ this just means that, up to a weight factor, the residual signal is common for all three channels, $$l(k)=\hat{l}(k)+v_lx_r(k)$$

$$r(k)=\hat{r}(k)+v_rx_r(k)$$

$$c(k)=\hat{c}(k)+v_cx_r(k) \tag{12}$$

Due to the orthogonality principle, the residual $x_r(k)$ is orthogonal to all three predicted signals $\hat{l}(k)$, $\hat{r}(k)$, $\hat{c}(k)$.

Problems Solved and Improvements Obtained by Preferred Embodiments of the Present Invention Evidently the following problems arise when using prediction based up-mix according to prior art as outlined above:

- The method relies on matching wave-form in a least mean square errors sense, which does not work for systems where the waveform of the downmixed signals are not maintained.
- The method does not provide the correct correlation structure between the reconstructed channels (as will be outlined below).
- The method does not re-construct the right amount of energy in the reconstructed channels.

Energy Compensation

As mentioned above, one of the problems with prediction based multi-channel re-construction is that the prediction error corresponds to an energy loss of the three reconstructed channels. In the below, the theory for this energy loss and a solution as taught by preferred embodiments is outlined. Firstly, the theoretical analysis is performed, and subsequently a preferred embodiment of the present invention according to the below outlined theory is given.

Let E, $\hat{E}$, and $E_r$ be the sum of the energies of the original signals in X, the predicted signals in $\hat{X}$ and the prediction error signals in $X_r$, respectively. From orthogonality, it follows that $$E=\hat{E}+E_r \tag{13}$$

The total prediction gain can be defined as $$p=\frac{E}{E_r}$$

but in the following it will be more convenient to consider the parameter $$\rho=\sqrt{\frac{\hat{E}}{E}} \tag{14}$$

Hence, $\rho^2 \epsilon [0,1]$ measures the total relative energy of the predictive upmix.

Given this ρ, it is possible to readjust each channel by applying a compensation gain, $\hat{z}_g(k)=g_z\hat{z}(k)$, such that $\|\hat{z}_g\|^2=\|z\|^2$ for z=1, r, c. Specifically, the target energy is given by (12), $$\|z\|^2=\|\hat{z}\|^2+v_z^2\|x_r\|^2 \tag{15}$$

so we need to solve $$g_z^2\|\hat{z}\|^2=\|\hat{z}\|^2+v_z^2\|x_r\|^2 \tag{16}$$

Here, since v is a unit vector, $$E_r=\|x_r\|^2, \tag{17}$$

and it follows from the definition (14) of ρ and (13) that $$E_r = \frac{1-\rho^2}{\rho}\hat{E}, \tag{18}$$

Putting all this together, we arrive at the gain $$g_z = \left(1 + v_z^2\frac{1-\rho^2}{\rho^2}\frac{\hat{E}}{\|\hat{z}\|^2}\right)^{1/2}, \tag{19}$$

It is evident that with this method, in addition to transmitting ρ, the energy distribution of the decoded channels has to be computed at the decoder. Moreover only the energies are reconstructed correctly, while the off diagonal correlation structure is ignored.

It is possible to derive a gain value that ensures that the total energy is preserved, while not ensuring that the energy of the individual channels are correct. A common gain for all channels $g_z=g$ that ensures that the total energy is preserved is obtained via the defining equation $g^2\hat{E}=E$. That is, $$g = \frac{1}{\rho}, \tag{20}$$

By linearity, this gain can be applied in the encoder to the downmixed signals, so that no additional parameter has to be transmitted.

Figure 2:
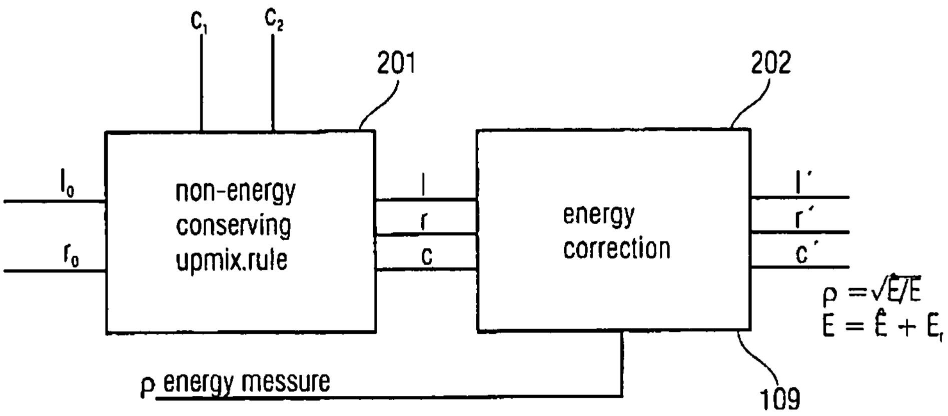
FIG. 2 illustrates a predictive up-mix with energy compensation.

FIG. 2. outlines a preferred embodiment of the present invention that re-creates the three channels while maintaining the correct energy of the output channels. The downmixed signals $l_0$ and $r_0$ are input to the upmix module 201, along with the prediction parameters $c_1$ and $c_2$. The upmix module re-creates the upmix matrix C based on knowledge about the downmix matrix D and the received prediction parameters. The three output channels from 201 are input to 202 along with the adjustment parameter ρ. The three channels are gain adjusted as a function of the transmitted parameter ρ and the energy corrected channels are output.

Figure 3:
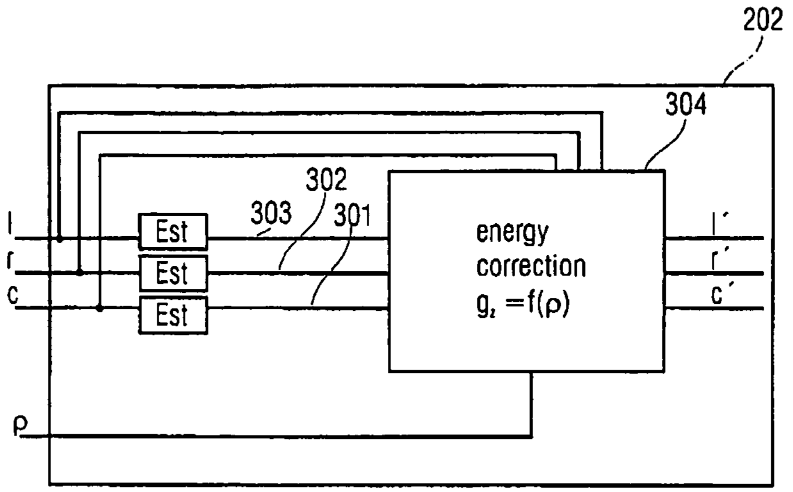
FIG. 3 illustrates an energy compensation in the predictive up-mix.

In FIG. 3 a more detailed embodiment of the adjustment module 202 is displayed. The three up-mixed channels are input to adjustment module 304, as well as to module 301, 302 and 303 respectively. The energy estimation modules 301-303 estimates the energy of the three up-mixed signals and inputs the measured energy to adjustment module 304. The control signal ρ (representing the prediction gain) received from the encoder is also input to 304. The adjustment module implements equation (19) as outlined above.

Figure 4:
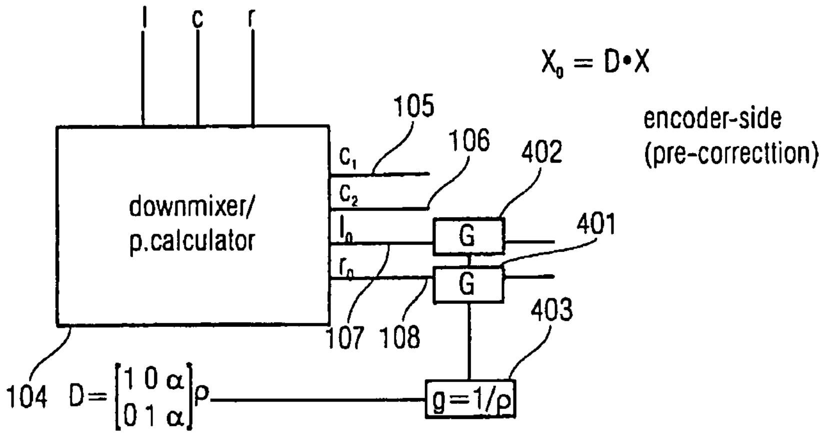
FIG. 4 illustrates a prediction parameter estimator on the encoder side with energy compensation of the down-mix signal.

In an alternative implementation of the present invention the energy correction can be done on the encoder side. FIG. 4 illustrates an implementation of the encoder where the down-mixed signals $l_0$ 107 and $r_0$ 108 are gain adjusted by 401 and 402 according to a gain value calculated by 403. The gain value is derived according to equation (20) above. As outlined above it is an advantage of this embodiment of the present invention, since it is not necessary to calculate the energy of the three re-created channels from the predictive up-mix. However, this only ensures that the total energy of the three re-created channels is correct. It does not ensure that the energy of the individual channels are correct.

A preferred example for a down-mixing matrix corresponding to equation (3) is noted below the down-mixer in FIG. 4. However, the down-mixer can apply any general down-mix matrix as outlined in equation (2).

As will be outlined later on, for the present case of a down-mixer having, as an input, three channels, and, having, as an output, two channels, two additional up-mix parameters $c_1$, $c_2$ are at least required. When a down-mixing matrix D is variable or not fully known to a decoder, also additional information on the used down-mix has to be transmitted from the encoder-side to a decoder-side, in addition to the parameters 105 and 106.

Correlation Structure

One of the problems with the up-mix procedure described by prior art is that it does not re-construct the correct correlation between the re-created channels. Since, as was outlined above, the centre channel is predicted as a linear combination of the left down-mix channel and the right down-mix channel, and the left and right channels are reconstructed by subtracting the predicted center channel from the left and right down-mix channels. It is evident that the prediction error will result in remains of the original center channel in the predicted left and right channel. This implies that the correlations between the three channels are not the same for the reconstructed channels as it was for the original three channels.

A preferred embodiment teaches that the predicted three channels should be combined with de-correlated signals in accordance with the measured prediction error.

The basic theory for achieving the correct correlation structure is now outlined. The special structure of the residual can be used to reconstruct the full 3×3 correlation structure XX* by substituting a de-correlated signal $x_d$ for the residual in the decoder.

First, note that the normal equations (6) lead to $X_r X^*_0=0$ so $$X_r\hat{X}^*=0,\ \hat{X}X^*_r=0 \tag{21}$$

Hence, as $X=\hat{X}+X_r$, $$XX^*=\hat{X}\hat{X}^*+X_rX^*_r=\hat{X}\hat{X}^*+vv^*E_r \tag{22}$$

where (10) and (17) were applied for the last equality.

Let $x_d$ be a signal de-correlated from all decoded signals $\hat{l}$, $\hat{r}$, $\hat{c}$ such that $\hat{X}x^*_r=0$. The enhanced signal $$Y=\hat{X}+vx_d \tag{23}$$

then has the correlation matrix $$YY^*=\hat{X}\hat{X}^*+vv^*\|x_d\|^2 \tag{24}$$

In order to completely reproduce the original correlation matrix (22), it suffices that $$\|x_d\|^2=E_r \tag{25}$$

If $x_d$ is obtained by de-correlating the downmixed signal, say $$\frac{1}{2}(l_0 + r_0),$$

followed by a gain γ then it should hold that $$\gamma^2 \left\| \frac{1}{2}(l_0 + r_0) \right\|^2 = E_r \tag{26}$$

This gain can be computed in the encoder. However, if the more well-defined parameter $\rho^2 \in [0,1]$ from (14) is to be used, estimation of Ê and $$\left\| \frac{1}{2}(l_0 + r_0) \right\|^2$$

has to be performed in the decoder. In light of this, a more attractive alternative is to generate $x_d$ using three decorrelators $$x_d = \gamma \cdot (d_1\{\hat{l}\} + d_2\{\hat{r}\} + d_3\{\hat{c}\}) \tag{26a}$$

since then $\|x_d\|^2 = \gamma^2 \hat{E}$, so (25) is satisfied by the choice $$\gamma = \sqrt{\frac{1}{\rho^2} - 1}\,. \tag{27}$$

Figure 5:
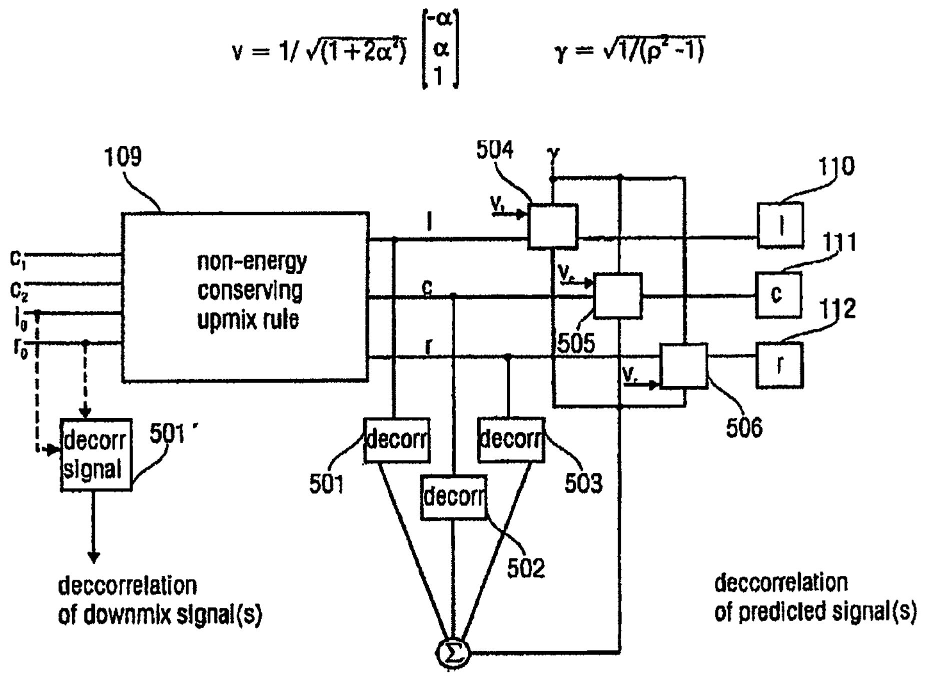
FIG. 5 illustrates a predictive up-mix with correlation reconstruction.

FIG. 5 illustrates one embodiment of the present invention for predictive up-mix of three channels from two down-mix channels, while maintaining the correct correlation structure between the channels. In FIG. 5 module 109, 110, 111 and 112 are the same as in FIG. 1 and will not be elaborated further on here. The three up-mixed signals that are output from 109 are input to de-correlation modules 501, 502 and 503. These generate mutually de-correlated signals. The de-correlated signals are summed and input to the mixing modules 504, 505 and 506, where they are mixed with the output from 109.

Figure 6:
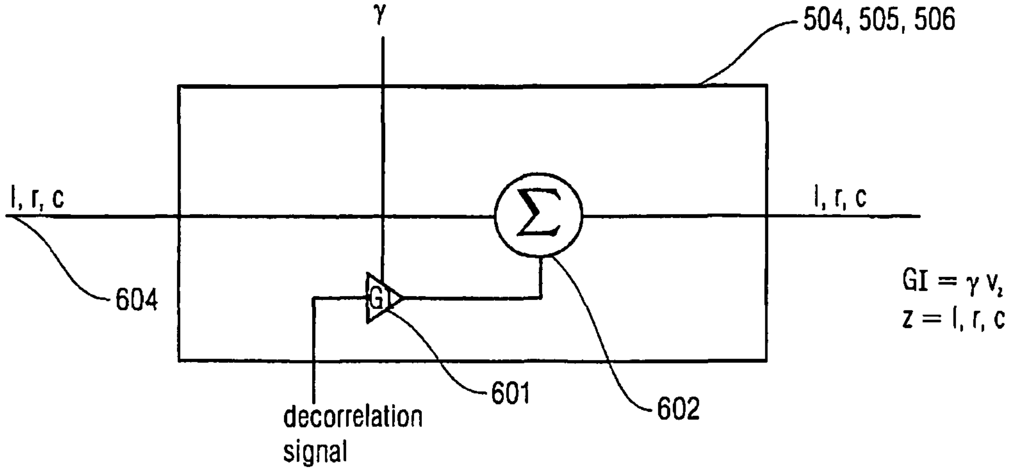
FIG. 6 illustrates a mixing module for mixing the decorrelated signal with the up-mixed signal in the up-mix with correlation reconstruction.

The mixing of the predictive up-mixed signals with decorrelated versions of the same is an essential feature of the present invention. In FIG. 6 one embodiment of the mixing modules 504, 505 and 506 is displayed. In this embodiment of the invention the level of the de-correlated signal is adjusted by 601 based on the control signal γ. The de-correlated signal is subsequently added to the predictive up-mixed signal in 602.

A third preferred embodiment uses decorrelators 501, 502, 503 for the up-mixed channels. A de-correlated signal can also be generated by a de-correlator 501', which receives, as an input signal, the down-mix channel or even all down-mix channels. Furthermore, in case of more than one down-mix channel, as shown in FIG. 5, the de-correlation signal can also be generated by separate de-correlators for the left base channel $l_0$ and the right base channel $r_0$ and by combining the output of these separate de-correlators. This possibility is substantially the same as the possibility shown in FIG. 5, but has a difference to the possibility shown in FIG. 5 in that the base channels before up-mixing are used.

Furthermore, it is outlined in connection with FIG. 5 that the mixing modules 504, 505 and 506 do not only receive the factor γ, which is equal for all three channels, since this factor only depends on the energy measure ρ, but also receive the channel-specific factor νl, νc and νr, which is determined as outlined in connection with equations (10) and (11). This parameter, however, does not have to be transmitted from an encoder to a decoder, when the decoder knows the down-mix used at the encoder. Instead, these parameters in the matrix ν as shown in equation (10) and (11) are preferably pre-programmed into the mixing modules 504, 505, and 506 so that these channel-specific weighting factors do not have to be transmitted (but can of course be transmitted when required).

In FIG. 6, it is shown that the weighting device 601 adjusts the energy of the de-correlated signal using the product of γ and the channel-specific down-mix-dependent parameter νz, wherein z stands for l, r or c. In this context, it is noted that equation (26a) makes sure that the energy of $x_d$ is equal to the sum energy of the predictively up-mixed left, right and centre channels. Therefore, device 601 can simply be implemented as a scaler using the scaling factor GI. When, however, the de-correlated signal is generated alternatively, the mixing module 504, 505, 506 has to perform an absolute energy adjustment of the decorrelated signal added by adding device 602 so that the energy of the signal added at adder 602 is equal to the energy of the residual signal, e.g., the energy, which is lost by the non-energy preserving predictive up-mix.

Figure 7:
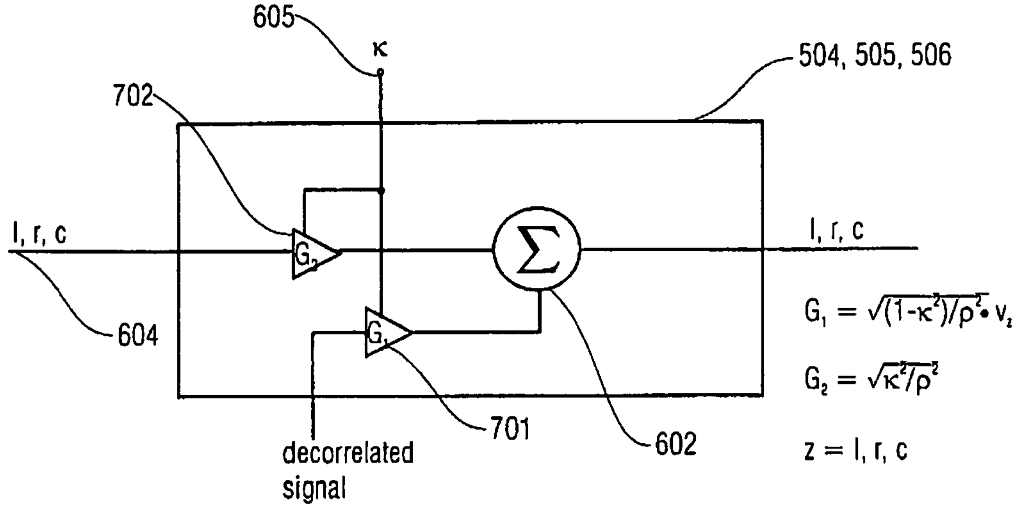
FIG. 7 illustrates an alternative mixing module for mixing the decorrelated signal with the up-mixed signal in the up-mix with correlation reconstruction.

Regarding the channel-specific down-mix-dependent parameter νz, the same remarks as outlined above with respect to FIG. 6 also apply for the FIG. 7 embodiment.

Furthermore, it is to be noted here that the FIG. 6 and FIG. 7 embodiment are based on the recognition that at least a part of the energy lost in the predictive up-mixing is added using a de-correlation signal. In order to have correct signal energies and correct portions of the dry signal component (uncorrelated) signal and the "wet" signal component (de-correlated), it is to be made sure that the "dry" signal input into the mixing module 504 is not pre-scaled. When, for example, the base channels have been pre-corrected on the de-encoder-side (as shown in FIG. 4) then this pre-correction of FIG. 4 has to be compensated for by multiplying the channel by the (relative) energy measure ρ before inputting the channel into the mixer box 504, 505 or 506. Additionally, the same procedure has to be done, when such an energy correction has been performed on a decoder-side before entering the down-mix channels into the up-mixer 109 as shown in FIG. 5.

When only a part of the residual energy is to be covered by a de-correlated signal, pre-correction only has to be partly removed by pre-scaling the signal input into the mixing box 504, 505, 506 by a ρ-dependent factor, which is, however, closer to one than the factor ρ itself. Naturally, this partly-compensating pre-scaling factor will depend on the encoder-generated signal κ input at 605 in FIG. 7. When such a partly pre-scaling has to be performed, then the weighting factor applied in $G_2$ is not necessary. Instead, then the branch from input 604 to the summer 602 will be the same as in FIG. 6.

Controlling the Degree of Decorrelation

A preferred embodiment of the invention teaches that the amount of de-correlation added to the predicted up-mixed signals can be controlled from the encoder, while still maintaining the correct output energy. This is since in a typical "interview" example of dry speech in the center channel and ambience in the left and right channels, the substitution of de-correlated signal for prediction error in the center channel may be undesirable.

According to a preferred embodiment of the present invention an alternative mixing procedure to the one outlined in FIG. 5 can be used. It will be shown below how according to the present invention the issues of total energy preservation and true correlation reproduction can be separated and the amount of de-correlation can be controlled by the parameter κ.

We will assume that a total energy preserving gain compensation (20) has been performed on the downmixed signal, so that we first obtain the decoded signal $\hat{X}/\rho$. From this, a decorrelated signal d with same total energy $\|d\|^2=\hat{E}/\rho^2$ is produced, for instance by use of three decorrelators as in the previous section. The total upmix is then defined according to $$Y_\kappa = \kappa \cdot \frac{1}{\rho}\hat{X} + \sqrt{1-\kappa^2} \cdot vd. \tag{29}$$

where $\kappa \in [\rho, 1]$ is a transmitted parameter. The choice κ=1 corresponds to total energy preservation without decorrelated signal addition and κ=ρ corresponds to full 3×3 correlation structure reproduction. We have $$Y_\kappa Y_\kappa^* = \frac{\kappa^2}{\rho^2}\hat{X}\hat{X}^* + \frac{1-\kappa^2}{\rho^2}vv^*\hat{E}, \tag{30}$$

so the total energy is preserved for all $\kappa \in [\rho, 1]$, as it can be seen by computing the traces (sum of diagonal values) of the matrices in (30). However, correct individual energy is only obtained for κ=ρ.

FIG. 7 illustrates an embodiment of the mixing modules 504, 505 and 506 of FIG. 5 according to the theory outlined above. In this alternative of the mixing modules the control parameter γ is input to 702 and 701. The gain factor used for 702 corresponds to κ according to equation (29) above, and the gain factor used for 701 corresponds to $\sqrt{1-\kappa^2}$ according to equation (29) above.

The above described embodiment of the present invention, allows the system to employ a detection mechanism on the encoder side, that estimates the amount of de-correlation to be added in the prediction based up-mix. The implementation described in FIG. 7 will add the indicated amount of de-correlated signal, and apply energy correction so that the total energy of the three channels is correct, while still being able to replace an arbitrary amount of the prediction error by de-correlated signal.

This means that for an example with three ambient signals, e.g. a classical music piece, with a lot of ambience, the encoder can detect the lack of a "dry" center channel, and let the decoder replace the entire prediction error with de-correlated signal, thus re-creating the ambience of the sound from the three channels in a way that would not be possible with prior-art prediction based methods alone. Furthermore, for a signal with a dry center channel, e.g. speech in the center channel and ambient sounds in the left and right channels, the encoder detects that replacing the prediction error by de-correlated signal is not psycho-acoustically correct and instead let the decoder adjust the levels of the three reconstructed channels so that the energy of the three channels is correct. Obviously the extreme examples above represents two possible outcomes of the invention. It is not limited to cover just the extreme cases outlined in the above examples.

Adapting the Prediction Coefficients to Modified Waveforms.

As outlined above the prediction parameters are estimated by minimising the mean square error given the original three channels X and a downmix matrix D. However, in many situations it cannot be relied upon that the downmixed signal can be described as a downmix matrix D multiplied by a matrix X describing the original multichannel signal. One obvious example for this is when a so called "artistic downmix" is used, i.e. the two channel downmix can not be described as a linear combination of the multichannel signal. Another example is when the downmixed signal is coded by a perceptual audio codec that utilises stereo-pre processing or other tools for improved coding efficiency. It is commonly known in prior art that many perceptual audio codecs rely on mid/side stereo coding, where the side signal is attenuated under bitrate constrained condition, yielding an output that has a narrower stereo image than that of the signal used for encoding.

Figure 8:
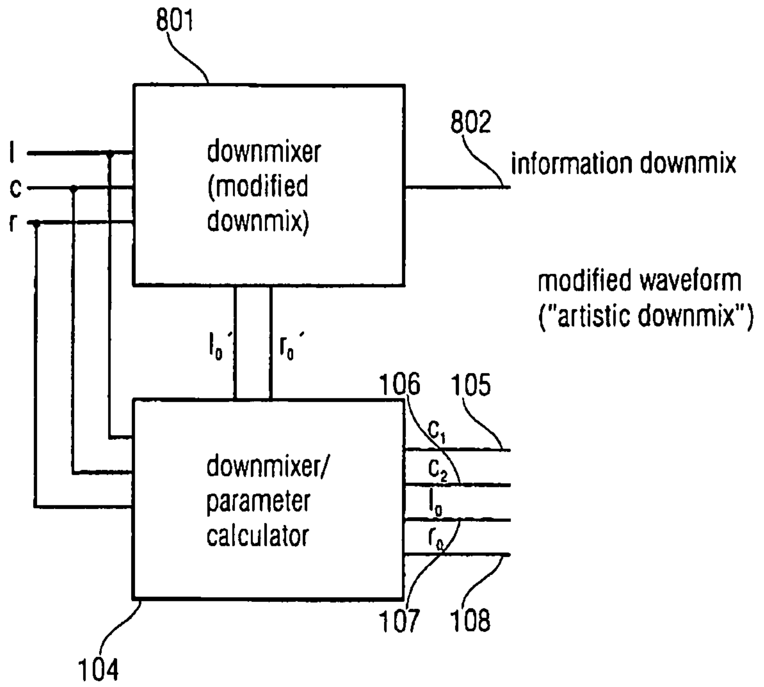
FIG. 8 illustrates prediction parameter estimation on the encoder side.

FIG. 8 displays a preferred embodiment of the present invention where the parameter extraction on the encoder side apart from the multi-channel signal also has access to the modified downmix signal. The modified down-mix is here generated by 801. If only two parameters of the C matrix are transmitted, a knowledge of the D matrix on the decoder side is needed in order to be able to do the up-mix, and get the least mean square error for all up-mixed channels. However, the present embodiment teaches that you can replace the downmixed signals $l_0$ and $r_0$ on the encoder side by the downmixed signals $l'_0$ and $r'_0$ that are obtained by using a downmix matrix D that is not necessarily the same as that assumed on the decoder. Using the alternative downmix for parameter estimation on the encoder side only guarantees a correct center channel reproduction at the decoder side. By transmitting additional information from the encoder to the decoder a more accurate up-mix of the three channels can be obtained. In one extreme case all six elements of the C matrix can be transmitted. However, the present embodiment teaches that a subset of the C matrix can be transmitted if it is accompanied with information on the downmix matrix D used 802.

As mentioned earlier perceptual audio codecs employ mid/side coding for stereo coding at low bitrates. Furthermore, stereo pre-processing is commonly employed in order to reduce the energy of the side signal under bitrate constrained conditions. This is done based on the psycho acoustical notion that for a stereo signal reduction of the width of the stereo signal is a preferred coding artefact over audible quantisation distortion and bandwidth limitation.

Hence, if a stereo pre-processing is used, the down-mix equation (3), can be expressed as $$D_\alpha^\gamma = \begin{pmatrix} 1-\gamma & \gamma \\ \gamma & 1-\gamma \end{pmatrix}\begin{pmatrix} 1 & 0 & \alpha \\ 0 & 1 & \alpha \end{pmatrix} \tag{31}$$

where γ is the attenuation of the side signal. As outlined earlier the D matrix needs to be known on the decoder side in order to correctly be able to reconstruct the three channels. Hence, the present embodiment teaches that the attenuation factor should be sent to the decoder.

Figure 9:
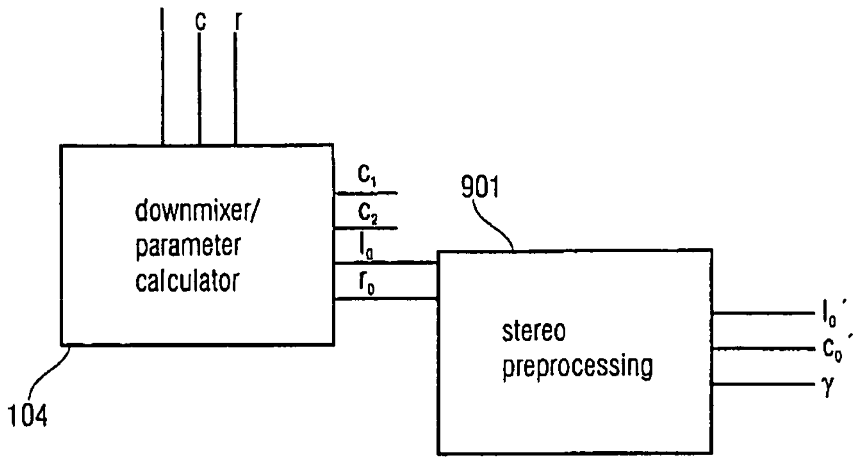
FIG. 9 illustrates prediction parameter estimation on the encoder side.

FIG. 9 displays another embodiment of the present invention where the downmix signal $l_0$ and $r_0$ output from 104 is input to a stereo pre-processing device 901 that limits the side signal ($l_0$-$r_0$) of the mid/side representation of the downmix signal by a factor γ. This parameter is transmitted to the decoder.

Parameterisation for HFR Codec Signals

If the prediction based upmix is used with High Frequency Reconstruction methods such as SBR [WO 98/57436], the prediction parameters estimated on the encoder side will not match the re-created high band signal on the decoder side. The present embodiment teaches the use of an alternative non-wave form based up-mix structure for re-creation of three channels from two. The proposed up-mix procedure is designed to re-create the correct energy of all up-mixed channels in case of un-correlated noise signals.

Assuming that the downmix matrix $D_\alpha$ as defined in (3) is used. And that we now will define the upmix matrix C. Then the upmix is defined by $$\hat{X}=CX_0 \tag{32}$$

Striving at only re-creating the correct energy of the up-mixed signal l(k), r(k), and c(k), where the energies are L, R and C, the up-mix matrix is chosen so that the diagonal elements of $\hat{X}\hat{X}^*$ and $XX^*$ are the same, according to:

$$XX^* = \begin{pmatrix} L & 0 & 0 \\ 0 & R & 0 \\ 0 & 0 & C \end{pmatrix}. \tag{35}$$

The corresponding expression for the downmix matrix will be $$X_0X_0^* = \begin{pmatrix} L+\alpha^2C & \alpha^2C \\ \alpha^2C & R+\alpha^2C \end{pmatrix}, \tag{36}$$

$$\hat{X}\hat{X}^* = CX_0X_0^*C^* = \begin{pmatrix} c_{11} & c_{12} \\ c_{21} & c_{22} \\ c_{31} & c_{32} \end{pmatrix} \begin{pmatrix} L+\alpha^2C & \alpha^2C \\ \alpha^2C & R+\alpha^2C \end{pmatrix} \begin{pmatrix} c_{11} & c_{21} & c_{31} \\ c_{12} & c_{22} & c_{32} \end{pmatrix}. \tag{37}$$

Setting the diagonal element, of $\hat{X}\hat{X}^*$ equal to the diagonal element of $XX^*$ translates to three equations defining the relation between the elements in C and L, R and C $$\begin{cases} Lc_{11}^2 + Rc_{12}^2 + C\alpha^2(c_{11}+c_{12})^2 = L \\ Lc_{21}^2 + Rc_{22}^2 + C\alpha^2(c_{21}+c_{22})^2 = R \\ Lc_{31}^2 + Rc_{32}^2 + C\alpha^2(c_{31}+c_{32})^2 = C \end{cases} \tag{38}$$

Based on the above an up-mix matrix can be defined. It is preferable to define an up-mix matrix that does not add the right down-mixed channel to the left up-mixed channel and vice versa. Hence, a suitable up-mix matrix may be $$C = \begin{pmatrix} \beta & 0 \\ 0 & \gamma \\ \delta & \delta \end{pmatrix} \tag{39}$$

This gives a C matrix according to:

$$C = \begin{pmatrix} \sqrt{\frac{L}{L+\alpha^2C}} & 0 \\ 0 & \sqrt{\frac{R}{R+\alpha^2C}} \\ \sqrt{\frac{C}{L+R+4\alpha^2C}} & \sqrt{\frac{C}{L+R+4\alpha^2C}} \end{pmatrix} \tag{40}$$

It can be shown that the elements of the C matrix can be re-created on the decoder side from the two transmitted parameters $$c_1 = \frac{L+R}{C} \text{ and } c_2 = \frac{L}{R}.$$

Figure 10:
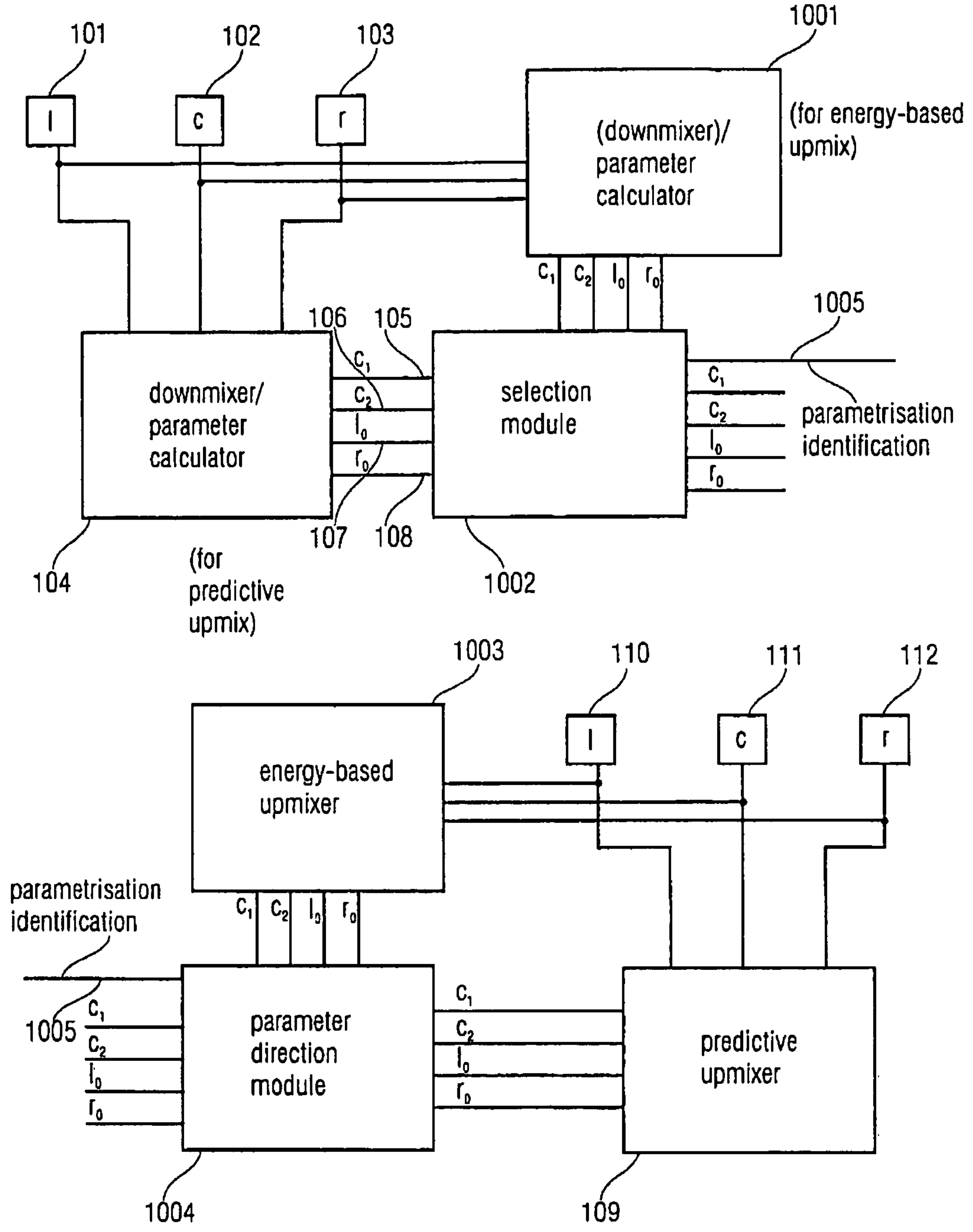
FIG. 10 illustrates prediction parameter estimation on the encoder side.

FIG. 10 outlines a preferred embodiment of the present invention. Here 101-112 are the same as in FIG. 1 and will not be elaborated on further here. The three original signals 101-103 are input to the estimation module 1001. This module estimates two parameters, e.g.

$$c_1 = \frac{L+R}{C} \text{ and } c_2 = \frac{L}{R}$$

from which the C matrix can be derived on the decoder side. These parameters along with the parameters output from 104 are input to selection module 1002. In one preferred embodiment, the selection module 1002 outputs the parameters from 104 if the parameters correspond to a frequency range that is coded by a wave-form codec, and outputs the parameters from 1001 if the parameters correspond to a frequency range reconstructed by HFR. The selection module 1002 also outputs information 1005 on which parameterisation is used for the different frequency ranges of the signal.

On the decoder side the module 1004 takes the transmitted parameters and directs them to the predictive up-mix 109 or the energy-based up-mix 1003 according to the above, dependent on the indication given by the parameter 1005. The energy based up-mix 1003 implements the up-mix matrix C according to equation (40).

The upmix matrix C as outlined in equation (40) has equal weights (δ) to obtain the estimated (decoder) signal c(k) from the two downmixed signals $l_0(k)$, $r_0(k)$. Based on the observation that the relative amount of the signal c(k) may differ in the two downmixed signals $l_0(k)$, $r_0(k)$ (i.e., C/L not equal to C/R), one could also consider the following generic upmix matrix:

$$C = \begin{pmatrix} f_1(c_1, c_2) & f_2(c_1, c_2) \\ f_2(c_2, c_1) & f_1(c_2, c_1) \\ f_3(c_1, c_2) & f_3(c_2, c_1) \end{pmatrix} \tag{41}$$

In order to estimate c(k), this embodiment also requires transmission of two control parameters $c_1$ and $c_2$, which are for example equal to $c_1=\alpha^2C/(L+\alpha^2X)$ and $c_2=\alpha^2X/(R+\alpha^2C)$. A possible implementation of the upmix matrix functions $f_i$ is then given by $$f_1(c_1, c_2) = \sqrt{1 - c_1^2} \tag{42}$$

$$f_2(c_1, c_2) = 0 \tag{43}$$

$$f_3(c_1, c_2) = \frac{c_1}{2\alpha} \tag{44}$$

The signalling of the different parameterisation for the SBR range according to the present invention is not limited to SBR. The above outlined parameterisation can be used in any frequency range where the prediction error of the prediction based up-mix is deemed too large. Hence, module 1002 may output the parameters from 1001 or 104 dependent on a multitude of criteria, such as coding method of the transmitted signals, prediction error etc.

A preferred method for improved prediction based multi-channel reconstruction includes, at the encoder side, extracting different multi-channel parameterisations for different frequency ranges, and, at the decoder side, applying these parameterisations to the frequency ranges in order to reconstruct the multi-channels.

A further preferred embodiment of the present invention includes a method for improved prediction based multi-channel reconstruction including, at the encoder side, extracting information on the down-mix process used and subsequently sending this information to a decoder, and, at the decoder side, applying an up-mix based on extracted prediction parameters and the information on the down-mix in order to reconstruct the multi-channels.

A further preferred embodiment of the present invention includes a method for improved prediction based multi-channel reconstruction, in which, at the encoder side, the energy of the down-mix signal is adjusted in accordance with a prediction error obtained for the extracted predictive up-mix parameters.

A further preferred embodiment of the present invention relates to a method for improved prediction based multi-channel reconstruction, in which, at the decoder side, an energy lost due to the prediction error is compensated for by applying a gain to the up-mixed channels.

A further embodiment of the present invention relates to a method for improved prediction based multi-channel reconstruction, in which, at the decoder side, the energy lost due to a prediction error is replaced by a de-correlated signal.

A further preferred embodiment of the present invention relates to a method for improved prediction based multi-channel reconstruction, in which, at the decoder side, a part of the energy lost due to a prediction error is replaced by a de-correlated signal, and a part of the energy lost is replaced by applying a gain to the up-mixed channels. This part of the energy lost is preferably signalled from an encoder.

A further preferred embodiment of the present invention is an apparatus for improved prediction based multi-channel reconstruction comprising means for adjusting the energy of the down-mix signal in accordance with the prediction error obtained for the extracted predictive up-mix parameters.

A further preferred embodiment of the present invention is an apparatus for improved prediction based multi-channel reconstruction comprising means for compensating for the energy loss due to the prediction error by applying a gain to the up-mixed channels.

A further preferred embodiment of the present invention is an apparatus for improved prediction based multi-channel reconstruction comprising means for replacing the energy lost due to the prediction error by a de-correlated signal.

A further preferred embodiment of the present invention is an apparatus for improved prediction based multi-channel reconstruction comprising means for replacing part of the energy lost due to the prediction error by a de-correlated signal, and part of the energy lost by applying a gain to the up-mixed channels.

A further preferred embodiment of the present invention is an encoder for improved prediction based multi-channel reconstruction including adjusting the energy of the down-mix signal in accordance with the prediction error obtained for the extracted predictive up-mix parameters.

A further preferred embodiment of the present invention is a decoder for improved prediction based multi-channel reconstruction including compensating for an energy loss due to the prediction error by applying a gain to the up-mixed channels.

A further preferred embodiment of the present invention relates to a decoder for improved prediction based multi-channel reconstruction including replacing the energy lost due to the prediction error by a de-correlated signal.

A further preferred embodiment of the present invention is a decoder for improved prediction based multi-channel reconstruction including replacing a part of the energy lost due to the prediction error by a de-correlated signal, and a part of the energy lost by a applying a gain to the down-mixed channels.

Figure 11:
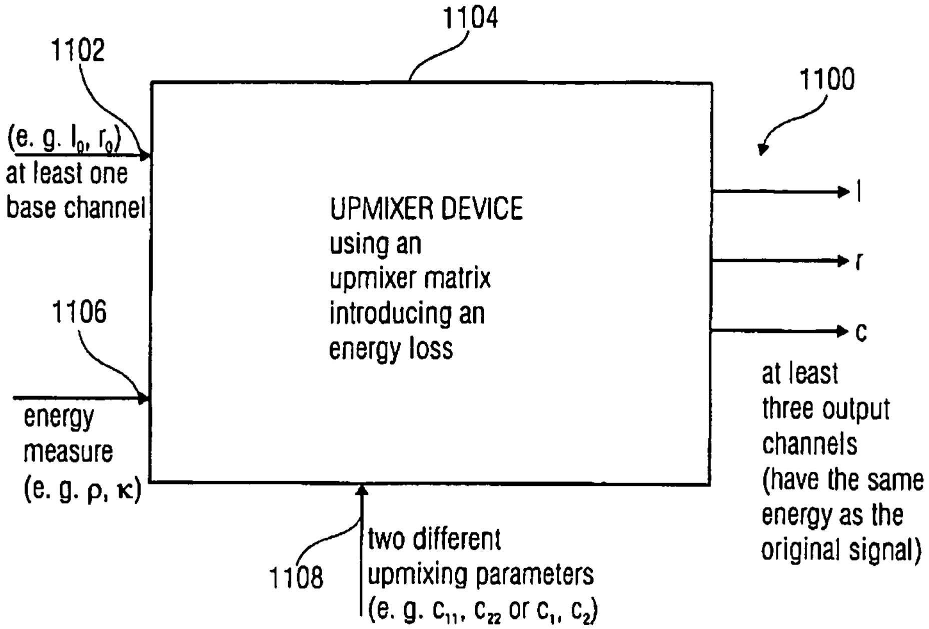
FIG. 11 illustrates an inventive up-mixer device.

FIG. 11 shows a multi-channel synthesiser for generating at least three output channels 1100 using an input signal having at least one base channel 1102, the at least one base channel being derived from an original multi-channel signal. The multi-channel synthesiser as shown in FIG. 11 includes an up-mixer device 1104, which can be implemented as shown in any of the FIGS. 2 to 10. Generally, the upmixer device 1104 is operable to up-mix the at least one base channel using an up-mixing rule so that the at least three output channels are obtained. The up-mixer 1104 is operative to generate the at least three output channels in response to an energy measure 1106 and at least two different up-mixing parameters 1108 using an energy-loss introducing up-mixing rule so that the at least three output channels have an energy, which is higher than an energy of signals resulting from the energy-loss introducing up-mixing rule alone. Thus, irrespective of an energy error depending on the energy-loss introducing up-mixing rule, the invention results in an energy compensated result, wherein the energy compensation can be done by scaling and/or addition of a decorrelated signal. The at least two different up-mixing parameters 1108, and the energy measure 1106 are included in the input signal.

Preferably, the energy measure is any measure related to an energy loss introduced by the upmixing rule. It can be an absolute measure of the upmix-introduced energy error or the energy of the upmix signal (which is normally lower in energy than the original signal), or it can be a relative measure such as a relation between the original signal energy and the upmix signal energy or a relation between the energy error and the original signal energy or even a relation between the energy error and the upmix signal energy. A relative energy measure can be used as a correction factor, but nevertheless is an energy measure since it depends on the energy error introduced into the upmix signal generated by an energy-loss introducing upmixing rule or—stated in other words—a non-energy-preserving upmixing rule.

An exemplary energy-loss introducing upmixing rule (non-energy-preserving upmixing rule) is an upmix using transmitted prediction coefficients. In case of a non-prefect prediction of a frame or subband of a frame, the upmix output signal is affected by a prediction error, corresponding to an energy loss. Naturally, the prediction error varies from frame to frame, since in case of an almost perfect prediction (a low prediction error) only a small compensation (by scaling or adding a decorrelated signal) has to be done while in case of a larger prediction error (a non-perfect prediction) more compensation has to be done. Therefore, the energy measure also varies between a value indicating no or only a small compensation and a value indicating a large compensation.

When the energy measure is considered as an InterChannel Coherence (ICC) value, which consideration is natural, when the compensation is done by adding a decorrelated signal scaled depending on the energy measure, the preferably used relative energy measure (ρ) varies typically between 0.8 and 1.0, wherein 1.0 indicates that the upmixed signals are decorrelated as required or that no decorrelated signal has to be added or that the energy of the predictive upmix result is equal to the energy of the original signal or that the prediction error is zero.

However, the present invention is also useful in connection with other energy-loss introducing upmixing rules, i.e. rules that are not based on waveform matching but that are based on other techniques, such as the use of codebooks, spectrum matching, or any other upmixing rules that do not care for energy preservation.

Generally, the energy compensation can be performed before or after applying the energy-loss introducing upmixing rule. Alternatively, the energy loss compensation can even be included into the upmixing rule such as by altering the original matrix coefficients using the energy measure so that a new upmixing rule is generated and used by the up-mixer. This new upmixing rule is based on the energy-loss introducing upmixing rule and the energy measure. Stated in other words, this embodiment is related to a situation in which the energy compensation is "mixed" into the "enhanced" upmixing rule so that the energy compensation and/or the addition of a decorrelated signal are performed by applying one or more upmixing matrices to an input vector (the one or more base channel) to obtain (after the one or more matrix operations) the output vector (the reconstructed multi-channel signal having at least three channels).

Preferably, the up-mixer device receives two base channels $l_0$, $r_0$ and outputs three re-constructed channels l, r and c.

Figure 12:
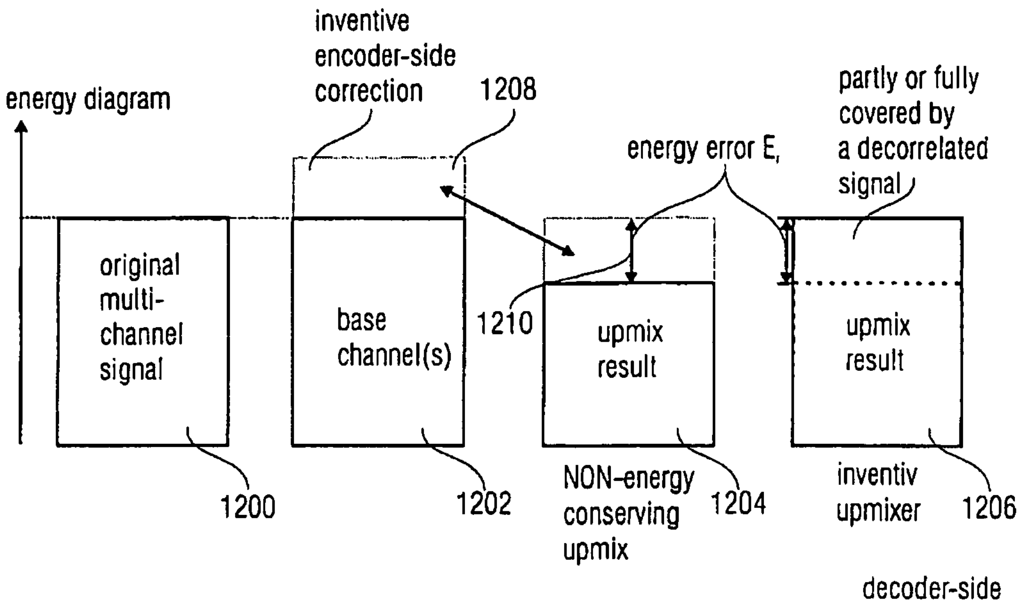
FIG. 12 illustrates an energy chart showing the result of an energy-loss introducing up-mix and the preferred compensation.

Subsequently, reference is made to FIG. 12 to show an example energy situation at different positions on an encoder-decoder-path. Block 1200 shows an energy of a multi-channel audio signal such as a signal having at least a left channel, a right channel and a centre channel as shown in FIG. 1. For the embodiment in FIG. 12, it is assumed that the input channels 101, 102, 103 in FIG. 1 are completely uncorrelated, and that the down-mixer is energy-preserving. In this case, the energy of the one or more base channels indicated by block 1202 is identical to the energy 1200 of the multi-channel original signal. When the original multi-channel signals are correlated to each other, the base channel energy 1202 can be lower than the energy of the original multi-channel signal, when, for example, the left and the right (partly) cancel each other.

For the subsequent discussion, however, it is assumed that the energy 1202 of the base channels is the same as the energy 1200 of the original multi-channel signal.

1204 illustrates the energy of the up-mix signals, when the up-mix signals (e.g., 110, 111, 112 of FIG. 1) are generated using a non-energy preserving up-mix or a predictive up-mix as discussed in connection with FIG. 1. Since, as will be outlined later with respect to FIG. 14*a*, and 14*b*, such a predictive up-mix introduces an energy error $E_r$, the energy 1204 of the up-mix result will be lower than the energy of the base channels 1202.

The up-mixer 1104 is operative to output output channels, which have an energy, which is higher than the energy 1204. Preferably, the up-mixer device 1104 performs a complete compensation so that the up-mix result 1100 in FIG. 11 has an energy as shown at 1206.

Preferably, the up-mix result, the energy of which is shown at 1204, is not simply up-scaled as shown in FIG. 2, or individually up-scaled as shown in FIG. 3 or encoder-side up-scaled as shown in FIG. 4. Instead, the remaining energy $E_r$, which corresponds to the error due to the predictive up-mix is "filled up" using a de-correlated signal. In another preferred embodiment, this energy error $E_r$ is only partly covered by a de-correlated signal, while the rest of the energy error is made up by up-scaling the up-mix result. The complete covering of the energy error by a decorrelated signal is shown in FIG. 5 and FIG. 6, while the "in-part"-solution is illustrated by FIG. 7.

FIG. 13 shows a plurality of energy-compensation methods, e.g., methods, which have in common the feature that, based on an energy measure which depends on the energy error, the energy of the output channels is higher than the pure result of the predictive up-mix, i.e., the result of the (not-corrected) energy-loss introducing upmixing rule.

Number 1 of the Table in FIG. 13 relates to the decoder-side energy compensation, which is performed subsequent to the up-mix. This option is shown in FIG. 2 and is, additionally, further elaborated in connection with FIG. 3, which shows the channel-specific up-scaling factors $g_z$, which not only depend on the energy measure ρ, but which, additionally, depend on the channel-dependent down-mix factors $v_z$, wherein z stands for l, r or c.

Number 2 of FIG. 13 includes the encoder-side energy compensation method, which is performed subsequent to the down-mix, which is illustrated in FIG. 4. This embodiment is preferable in that the energy measure ρ or γ does not have to be transmitted from the encoder to the decoder.

Number 3 of the Table in FIG. 13 relates to the decoder-side energy compensation, which is performed before the up-mix. When FIG. 2 is considered, the energy correction 202, which is performed after the up-mix in FIG. 2 would be performed before the up-mix block 201 in FIG. 2. This embodiment results, compared to FIG. 2, in an easier implementation, since no channel-specific correction factors as shown in FIG. 3 are required, although quality losses might occur.

Number 4 of FIG. 13 relates to a further embodiment, in which an encoder-side correction is performed before down-mixing. When FIG. 1 is considered, channels 101, 102, 103 would be up-scaled by a corresponding compensation factor so that the down-mixer output is increased after down-mixing as shown at 1208 in FIG. 12. Thus, the number four embodiment in FIG. 13 has the same consequence for the base channels' output by an encoder as the number two embodiment of the present invention.

Number 5 of the FIG. 13 Table relates to the embodiment in FIG. 5, when the de-correlated signal is derived from the channels generated by the non-energy preserving up-mixing rule 109 in FIG. 5.

The number 6 embodiment in the Table in FIG. 13 relates to the embodiment, in which only part of the residual energy is covered by the de-correlated signal. This embodiment is illustrated in FIG. 7.

The number 8 embodiment of FIG. 13 is similar to the number 5 or 6 embodiment, but the de-correlated signal is derived from the base channels before up-mixing as outlined by box. 501' in FIG. 5.

Figure 14A:
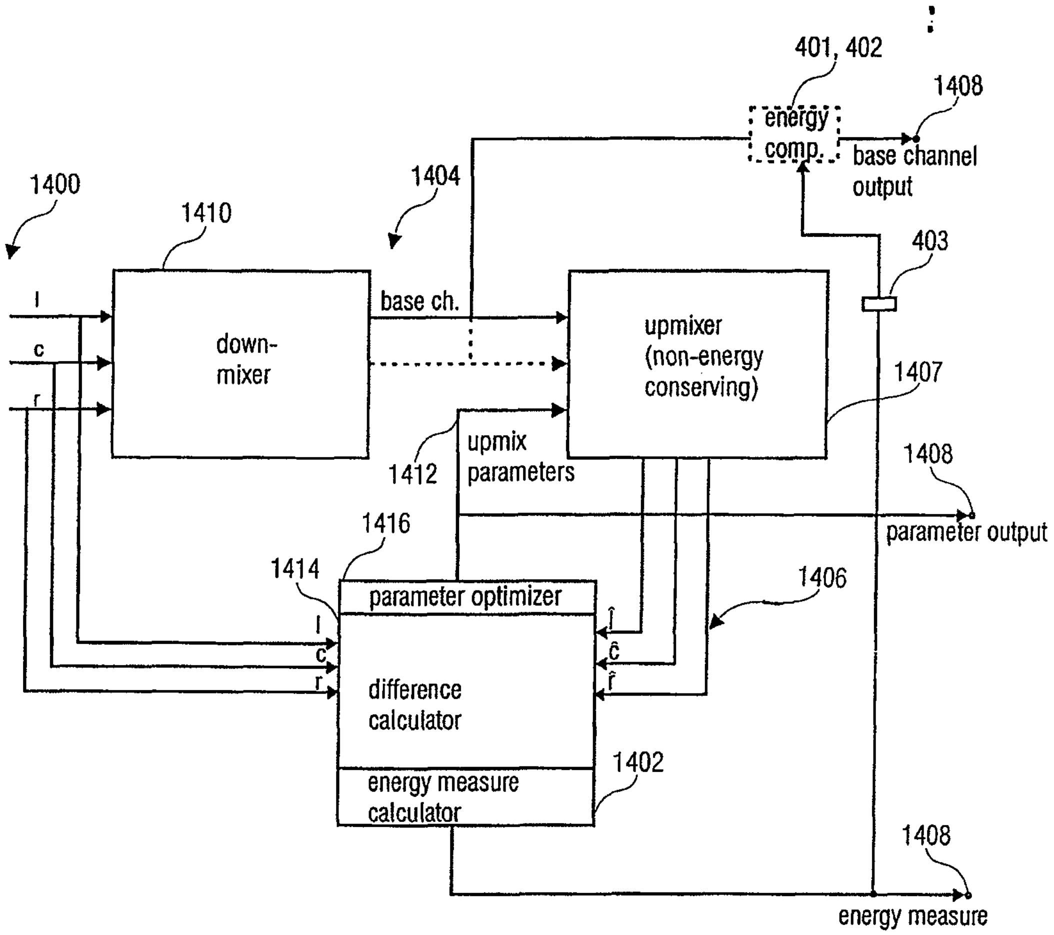
FIG. 14*a* a schematic diagram of a preferred multi-channel encoder.

Subsequently, a preferred embodiment of the encoder is described in detail. FIG. 14*a* illustrates an encoder for processing a multi-channel input signal 1400 having at least two channels and, preferably, having at least three channels l, c, r.

The encoder includes an energy measure calculator 1402 for calculating an error measure depending on an energy difference between an energy of the multi-channel input signal 1400 or an at least one base channel 1404 and an up-mixed signal 1406 generated by a non-energy conserving up-mixing operation 1407.

Furthermore, the encoder includes an output interface 1408 for outputting the at least one base channel after being scaled (401, 402) by a scaling factor 403 depending on the energy measure or for outputting the energy measure itself.

In a preferred embodiment, the encoder includes a down-mixer 1410 for generating the at least one base channel 1404 from the original multi-channels 1400. For generating the up-mix parameters, a difference calculator 1414 and a parameter optimiser 1416 are also present. These elements are operative to find the best-matching up-mix parameters 1412. At least two of this set of best fitting up-mix parameters are outputted via the output interface as the parameter output in a preferred embodiment. The difference calculator is preferably operative to perform a minimum means square error calculation between the original multi-channel signal 1400 and the up-mixer-generated up-mix signal for parameters input at parameter line 1412. This parameter optimisation procedure can be performed by several different optimisation procedures, which are all driven by the goal to obtain a best-matching up-mix result 1406 by a certain up-mixing matrix included in the up-mixer 1408.

Figure 14B:
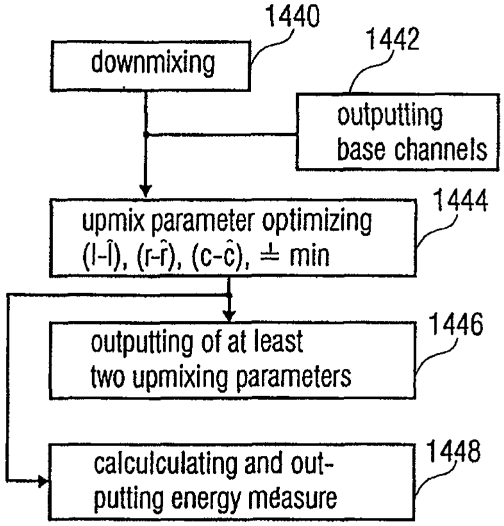
FIG. 14*b* a flow chart of the preferred method performed by the device of FIG. 14*a;*

The functionality of FIG. 14*a* encoder is shown in FIG. 14*b*. After a down-mixing step 1440 performed by the down-mixer 1410, the base channel or the plurality of base channels can be output as illustrated by 1442. Then, an up-mix parameter optimisation step 1444 is performed, which, depending on a certain optimisation strategy, can be an iterative or non-iterative procedure. However, iterative procedures are preferred. Generally, the up-mix parameter optimisation procedure can be implemented such that the difference between the up-mix result and the original signal is as low as possible. Depending on the implementation, this difference can be an individual channel-related difference or a combined difference. Generally, the up-mix parameter optimisation step 1444 is operative in minimising any cost function, which can be derived from individual channels or from combined channels so that, for one channel, a larger difference (error) is accepted, when a much better matching is, for example, achieved for the other two channels.

Then, when the best fitting parameters set, e.g., the best fitting up-mix matrix has been found, at least two up-mixing parameters of the parameters set generated by step 1444 are output to the output interface as indicated by step 1446.

Furthermore, after the up-mix parameter optimisation step 1444 is complete, the energy measure can be calculated and output as indicated by step 1448. Generally, the energy measure will depend on the energy error 1210. In a preferred embodiment, the energy measure is the factor ρ which depends on the relation of the energy of the up-mix result 1406 and the energy of the original signal 1400 as shown in FIG. 2. Alternatively, the energy measure calculated and output can be an absolute value for the energy error 1210 or can be the absolute energy of the up-mix result 1406, which, of course, depends on the energy error. In this context, it is to be noted that the energy measure as output by the output interface 1408 is preferably quantized, and, again preferably entropy-encoded using any well-known entropy-encoder such as an arithmetic encoder, a Huffman encoder or a run-length encoder, which is especially useful when there are many subsequent identical energy measures. Alternatively or additionally, the energy measures for subsequent time portions or frames can be difference-encoded, wherein this difference-encoding is preferably performed before entropy-coding.

Figures 15A, 15B:
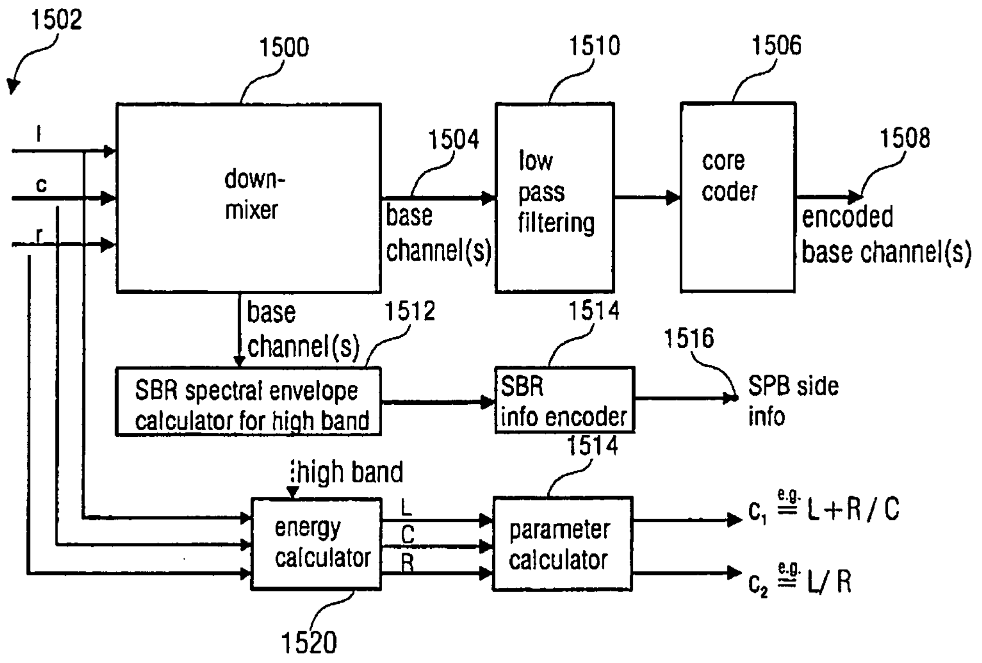
FIG. 15*a* a multi-channel encoder having a spectral band replication functionality for generating a different parameterisation compared to the device in FIG. 14*a;*
FIG. 15*b* a tabular illustration of frequency-selective generation and transmission of parametric data.

Subsequently, reference is made to FIG. 15*a* showing an alternative down-mixer embodiment, which is, in accordance with a preferred embodiment of the present invention, combined to the FIG. 14*a* encoder. The FIG. 15*a* embodiment covers an SBR-implementation, although this embodiment can also be used in cases, in which no spectral band replication is performed, but in which the complete bandwidth of the base channels is transmitted. The FIG. 15*a* encoder includes a down-mixer 1500 for down-mixing the original signal 1500 to obtain at least one base channel 1504. In a non-SBR-embodiment, the at least one base channel 1504 is input into a core coder 1506, which can be an AAC encoder for mono-signals in case of a single base channel, or which can be any stereo coder in case of for example two stereo base channels. On the output of the core coder 1506, a bit stream including an encoded base channel or including a plurality of encoded base channels is output (1508).

When the FIG. 15*a* embodiment has an SBR functionality, the at least one base channel 1504 is low-pass filtered 1510 before being input into the core coder. Naturally, the functionalities of blocks 1510 and 1506 can be implemented by a single encoder device, which performs low-pass filtering and core coding within a single encoding algorithm.

The encoded base channels at the output 1508 only include a low-band of the base channels 1504 in encoded form. Information on the high-band is calculated by an SBR spectral envelope calculator 1512, which is connected to an SBR information encoder 1514 for generating and outputting encoded SBR-side information at an output 1516.

The original signal 1502 is input into an energy calculator 1520, which generates channel energies (for a certain time period of the original channels l, c, r, wherein the channel energies are indicated by L, C, R, output by block 1520). The channel energies L, C, R, are input into a parameter calculator block 1522. The parameter calculator 1522 outputs two up-mix parameters c1, c2, which can, for example, be the parameters $c_1$, $c_2$, indicated in FIG. 15*a*. Naturally, other (e.g. linear) energy combinations involving the energies of all input channels can be generated by the parameter calculator 1522 for transmission to a decoder. Naturally, different transmitted up-mix parameters will result in a different way of calculating the remaining up-mixing matrix elements. As indicated in connection with equation (40) or equations (41-44), the up-mix matrix for the energy-directed FIG. 15 embodiment has at least four non-zero elements, wherein the elements in the third row are equal to each other. Thus, the parameter calculator 1522 can use any combination of energies L, C, R for example, from which the four elements in the up-mix matrix such as up-mix matrix indication (40) or (41) can be derived.

The FIG. 15*a* embodiment illustrates an encoder, which is operative to perform the energy-preserving, or, stated in general, the energy-derived up-mix for the whole bandwidth of a signal. This means that, on the encoder-side, which is illustrated in FIG. 15*a*, the parametric representation output by the parameter calculator 1522 is generated for the whole signal. This means that, for each sub-band of the encoded base channel, a corresponding set of parameters is calculated and output. When, for example, the encoded base channel, which is, for example, a full-bandwidth signal having ten sub-bands is considered, the parameter calculator might output ten parameters $c_1$ and $c_2$ for each sub-band of the encoded base channel. When, however, the encoded base channel would be a low-band signal in an SBR environment, for example only covering only the five lower subbands, then the parameter calculator 1522 would output a set of parameters for each of the five lower sub-bands, and, additionally, for each of the five upper sub-bands, although the signal at output 1508 does not include a corresponding sub-band. This is due to the fact, that such a sub-band would be recreated on the decoder-side, as will be subsequently described in connection with FIG. 16*a*.

Preferably, however, and as described in connection with FIG. 10, the energy calculator 1520 and the parameter calculator 1522 are only operative for the high-band part of the original signal, while parameters for the low-band part of the original signal are calculated by the predictive parameter calculator 104 in FIG. 10, which would correspond to the predictive up-mixer 109 in FIG. 10.

FIG. 15*b* shows a schematic representation of a parametric representation output by selection module 1002 in FIG. 10. Thus, a parametric representation in accordance with the present invention includes (with or without the encoded base channel(s) and, optionally, even without the energy measure) a set of predictive parameters for the low-band, e.g., for the sub-bands 1 to i and sub-band-wise parameters for the high-band, e.g., for the sub-bands i+1 to N. Alternatively, the predictive parameters and the energy style parameters can be mixed, e.g., that a sub-band having energy style parameters can be positioned between sub-bands having predictive parameters. Furthermore, a frame having only predictive parameters can follow a frame having only energy style parameters. Therefore, generally stated, the present invention as discussed in connection with FIG. 10 relates to different parameterisations, which can be different in the frequency direction as shown in FIG. 15*b* or which can be different in the time direction, when a frame having only predictive parameters is followed by a frame having only energy style parameters. Naturally, the distribution or parameterisation of sub-bands can change from frame to frame, so that, for example, sub-band i has a first (e.g. predictive) parameter set as shown in FIG. 15*b* at first frame, and has a second (e.g. energy style) parameter set in another frame.

Furthermore, the present invention is also useful when parameterisations different from the predictive parameterisation as shown in FIG. 14*a* or the energy style parameterisation as shown in FIG. 15*a* are used. Also further examples for parameterisation apart from predictive or energy style can be used as soon as any target parameter or target event indicates that the up-mix quality, the down-mix bit rate, the computational efficiency on the encoder side or on the decoder side or, for example, the energy consumption of e.g. battery-powered devices, etc. say that, for a certain sub-band or frame, the first parameterisation is better than the second parameterisation. Naturally, the target function can also be a combination of different individual targets/events as outlined above. An exemplary event would be a SBR-reconstructed high band etc.

Furthermore, it is to be noted that the frequency or time-selective calculation and transmission of parameters can be signalled explicitly as shown at 1005 in FIG. 10. Alternatively, the signalling can also be performed implicitly such as discussed in connection with FIG. 16*a*. In this case, predefined rules for the decoder are used, for example that the decoder automatically assumes that the transmitted parameters are energy style parameters for sub-bands belonging to the high-band in FIG. 15*b*, e.g., for subbands, which have been reconstructed by a spectral band replication or high-frequency regeneration technique.

Furthermore, it is to be noted that the encoder-side calculation of one, two or even more different parameterisations and the encoder-side selection, which parameterisation is transmitted is based on a decision using any encoder-side available information (the information can be an actually used target function or signalling information used for other reasons such as SBR processing and signalling) can be performed with or without transmitting the energy measure. Even when the preferred energy correction is not performed at all, e.g., when the result of the non-energy-conserving up-mix (predictive up-mix) is not energy-corrected, or when no corresponding pre-compensation on the encoder-side is performed, the preferred switching between different parameterisations is useful for obtaining a better multi-channel output quality and/or lower bit rate.

Particularly, the preferred switching between different parameterisations depending on available encoder-side information can be used with or without addition of a decorrelated signal completely or at least partly covering the energy error performed by the predictive up-mix as shown in connection with FIGS. 5 to 7. In this context, the addition of a decorrelated signal as described in connection with FIG. 5 is only performed for the subbands/frames, for which predictive up-mix parameters are transmitted, while different measures for de-correlation are used for those sub-bands or frames, in which energy style parameters have been transmitted. Such measures are, for example, down-scaling the wet signal and generating a de-correlated signal and scaling the de-correlated signal so that a required amount of de-correlation as, for example, required by a transmitted inter-channel-correlation measure such as ICC is obtained, when the properly scaled de-correlated signals are added to the dry signal.

Subsequently, FIG. 16*a* is discussed for illustrating a decoder-side implementation of the preferred up-mixing block 201 and the corresponding energy correction in 202. As discussed in connection with FIG. 11, transmitted up-mix parameter 1108 are extracted from a received input signal. These transmitted up-mix parameters are preferably input into a calculator 1600 for calculating the remaining up-mix parameters, when the up-mix matrix 1602 including energy compensation is to perform a predictive up-mix and a preceding or subsequent energy correction. The procedure for calculating the remaining up-mix parameters is subsequently discussed in connection with FIGS. 16*b*.

The calculation of the up-mix parameters is based on the equation in FIG. 16*b*, which is also repeated as equation (7). In the three-input-signal/two-output-signal embodiment, the down-mix matrix D has six variables. Additionally, the up-mix matrix C has also six variables. However, on the right hand side of equation (7), there are only four values. Therefore, in case of an unknown down-mix and unknown up-mix, one would have twelve unknown variables from matrices D and C and only four equations for determining these twelve variables. However, the down-mix is known so that the number of variables, which are unknown reduces to the coefficients of the up-mix matrix C, which has six variables, although there still exist four equations for determining these six variables. Therefore, the optimisation method as discussed in connection with step 1444 in FIG. 14*b* and as illustrated in FIG. 14*a* is used for determining at least two variables of the up-mix matrix, which are, preferably, $c_{11}$ and $c_{22}$. Now, since there exist four unknowns, e.g., $c_{12}$, $c_{21}$, $c_{31}$ and $c_{32}$ and since there exist four equations, e.g., one equation for each element in the identity matrix I on the right hand side of the equation in FIG. 16*b*, the remaining unknown variables of the up-mix matrix can be calculated in a straight-forward manner. This calculation is performed in the calculator 1600 for calculating the remaining up-mix parameters.

The up-mix matrix in the device 1602 is set in accordance with the two transmitted up-mix parameters as forwarded by broken line 1604 and by the remaining four up-mix parameters calculated by block 1600. This up-mix matrix is then applied to the base channels input via line 1102. Depending on the implementation, an energy measure for a low-band correction is forwarded via line 1106 so that a corrected up-mix can be generated and output. When the predictive up-mix is only performed for the low-band as, for example, implicitly signalled via line 1606, and when there exist energy style up-mix parameters on line 1108 for the high-band, this fact is signalled, for a corresponding sub-band, to the calculator 1600 and to the up-mix matrix device 1602. In the energy style case, it is preferred to calculate the up-mix matrix elements of up-mix matrix (40) or (41). To this end, the transmitted parameters as indicated below equation (40) or the corresponding parameters as indicated below equation (41) are used. In this embodiment, the transmitted up-mix parameters $c_1$, $c_2$ cannot be directly used for an up-mix coefficient, but the up-mix coefficients of the up-mix matrix as shown in equation (40) or (41) have to be calculated using the transmitted up-mix parameters $c_1$ and $c_2$.

For the high-band, an up-mix matrix as determined for the energy-based up-mix parameters is used for up-mixing the high-band part of the multi-channel output signals. Subsequently, the low-band part and the high-band part are combined in a low/high combiner 1608 for outputting the full-bandwidth reconstructed output channels l, r, c. As illustrated in FIG. 16*a*, the high-band of the base channels is generated using a decoder for decoding the transmitted low-band base channels, wherein this decoder is a mono-decoder for a mono base channel, and is a stereo decoder for two stereo base channels. This decoded low-band base channel(s) are input into an SBR device 1614, which additionally receives envelope information as calculated by device 1512 in FIG. 15*a*. Based on the low-band part and the high band envelope information, the high band of the base channels is generated to obtain full band-width base channels on the line 1102, which are forwarded into the up-mix matrix device 1602.

Figure 17:
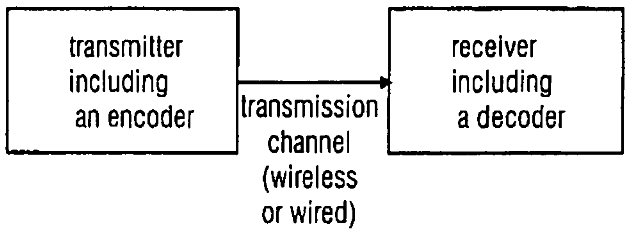
FIG. 17 a transmitter and a receiver of a transmission system.
Figure 18:
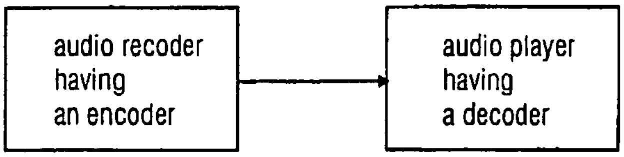
FIG. 18 an audio recorder having an inventive encoder and an audio player having a decoder.

The preferred methods or devices or computer programs can be implemented or included in several devices. FIG. 17 shows a transmission system having a transmitter including an inventive encoder and having a receiver including an inventive decoder. The transmission channel can be a wireless or wired channel. Furthermore, as shown in FIG. 18, the encoder can be included in an audio recorder or the decoder can be included in an audio player. Audio records from the audio recorder can be distributed to the audio player via the Internet or via a storage medium distributed using mail or courier resources or other possibilities for distributing storage media such as memory cards, CDs or DVDs.

Depending on certain implementation requirements of the inventive methods, the inventive methods can be implemented in hardware. The implementation can be performed using a digital storage medium, in particular a disk or a CD having electronically readable control signals stored thereon, which can cooperate with a programmable computer system such that the inventive methods are performed. Generally, the present invention is, therefore, a computer program product with a program code stored on a machine-readable carrier, the program code being configured for performing at least one of the inventive methods, when the computer program products runs on a computer. In other words, the inventive methods are, therefore, a computer program having a program code for performing the inventive methods, when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A multi-channel synthesizer for generating at least three output channels using an input signal having at least one base channel, the base channel being derived from an original multi-channel signal, comprising:

an energy measure provider for providing an energy measure; and a up-mixer for up-mixing the at least one base channel based on an energy-loss introducing up-mixing rule so that the at least three output channels are obtained, wherein the up-mixer is operative to generate the at least three output channels in response to the energy measure provided by the energy measure provider and at least two different up-mixing parameters so that the at least three output channels have an energy higher than an energy of a signal obtained by only using the energy-loss introducing up-mixing rule instead of an energy error, the energy error depending on the energy-loss introducing up-mixing rule, and wherein the at least two different up-mixing parameters and the energy measure for controlling the up-mixer are included in the input signal, wherein the base channel is a base audio channel and the output channels are output audio channels, and wherein at least one of the energy measure provider and the up-mixer comprises a hardware implementation.

2. The multi-channel synthesizer in accordance with claim 1, in which the energy-loss introducing up-mixing rule is a predictive up-mixing rule using an up-mixing matrix having matrix coefficients, which are based on prediction coefficients, and in which the at least two different up-mix parameters are two different elements of the up-mixing matrix or are parameters, from which the two different elements of the up-mixing matrix are derivable.

3. The multi-channel synthesizer in accordance with claim 1, in which the energy measure directly or indirectly indicates a relation of an energy of an up-mix result using the energy-loss introducing up-mixing rule to an energy of the original multi-channel signal, or a relation of the energy error to an energy or the original multi-channel signal or the energy error in absolute terms.

4. The multi-channel synthesizer in accordance with claim 1, in which the up-mixer includes a calculator for deriving an up-mix matrix based on the at least two up-mixing parameters and information on a down-mix rule used for generating the at least one base channel from the original multi-channel signal.

5. The multi-channel synthesizer in accordance with claim 1, in which the up-mixer is operative to process a left base channel and a right base channel and to output a left output signal, a right output signal and a centre signal, wherein the left base channel and the right base channel are a stereo-compatible representation of the multi-channel signal.

6. The multi-channel synthesizer in accordance with claim 1, in which the up-mixer is operative to individually scale the at least three output channels using scaling factors, wherein a scaling factor for an output channel depends on an energy of an up-mix result of the energy-loss introducing up-mix rule and an energy of the output channel after up-mixing using the energy-loss introducing up-mixing rule and information on a down-mix for generating the at least base channel.

7. The multi-channel synthesizer in accordance with claim 6, in which the scaling factor is determined as follows:

$$g_z = \left(1 + v_z^2 \frac{1-\rho^2}{\rho^2} \frac{\hat{E}}{\|\hat{z}\|}\right)$$

wherein $v_z$ is a down-mix-dependent factor for an output channel z, wherein ρ is the energy measure, wherein $\hat{E}$ is the energy of the multi-channel signal generated by the energy-loss introducing up-mix rule, and wherein $\|\hat{Z}\|$ represents an energy of the to be scaled output channel of the energy-loss introducing up-mix rule.

8. The multi-channel synthesizer in accordance with claim 1, in which the up-mixer further comprises a de-correlator for generating a de-correlated signal from the at least one base channel or from at least one the output signals of the energy-loss introducing up-mixing rule, and in which the up-mixer is operative to use the de-correlated signal such that an energy amount of the de-correlated signal in an output channel is smaller than or equal to an amount of the energy error as derivable by the energy measure.

9. The multi-channel synthesizer in accordance with claim 8, in which the up-mixer is operative to generate a de-correlation signal having an energy being equal to an energy of the output channel downscaled by a down-scaling factor, the downscaling factor depending on the energy measure, and in which the up-mixer is operative to add the decorrelated signal and an output signal of the energy-loss introducing up-mixing rule.

10. The multi-channel synthesizer in accordance with claim 8, in which the de-correlator is operative to individually de-correlate the at least three output channels by adding a de-correlated signal weighted by a channel-specific factor and weighted using the energy measure and to add the weighted de-correlated signal to an output signal of an up-mixer performing the energy-loss introducing up-mixing rule.

11. The multi-channel synthesizer in accordance with claim 9, in which the de-correlator is operative to filter an input signal using a digital filter.

12. The multi-channel synthesizer in accordance with claim 9, in which the downscaling factor is derived as follows:

$$\gamma = \sqrt{\frac{1}{\rho^2} - 1},$$

wherein γ is the downscaling factor, and wherein ρ is the energy measure.

13. The multi-channel synthesizer in accordance with claim 1, in which the up-mixer is operative to add, for partly or fully compensating the energy-loss due to the energy-loss introducing up-mixing rule a decorrelated signal having an energy smaller than the energy error and greater than 0 to at least one channel as generated by the energy-loss introducing up-mixing rule.

14. The multi-channel synthesizer in accordance with claim 13, in which, when the energy of the decorrelated signal is smaller than the energy error, the upmixer is operative to upscale the at least one base channel or a signal generated by the upmixing rule such that the combined energy of the upscaled signal or an upmix signal generated using the upscaled at least one base channel and the added decorrelated signal is equal to or smaller than an energy of the original signal.

15. The multi-channel synthesizer in accordance with claim 14, in which the energy of the added de-correlated signal is determined by a de-correlation factor, wherein a high de-correlation factor close to 1 indicates that a smaller level de-correlated signal is to be added, while a smaller de-correlation factor close to 0 indicates that a higher level de-correlation signal is to be added, and wherein the de-correlation measure is extracted from the input signal.

16. The multi-channel synthesizer in accordance with claim 13, in which the at least one base channel is a scaled version of a base channel generated by a down-mixing matrix, the scaling factor depending on the energy measure, so that the de-correlation information is the only transmitted energy measure also depending on the error energy.

17. The multi-channel synthesizer in accordance with claim 14, in which the energy measure included in the input signal includes a first energy value depending on the energy error, and including a second energy value depending on a degree of correlation.

18. The multi-channel synthesizer in accordance with claim 1, in which the input signal includes, in addition to the two different up-mixing parameters information on a down-mix underlying the at least one base channel, in which the up-mixer is operative to use the additional down-mixing information for generating an up-mixing matrix.

19. The multi-channel synthesizer in accordance with claim 18, in which information of a stereo pre-processing calculation is included in the input signal as the down-mix information.

20. The multi-channel synthesizer in accordance with claim 1, in which the input signal further includes an up-mixer mode indication indicating, in a first state that a first up-mixing rule is to be performed, and, indicating, in a second state, that a different second up-mixing rule is to be performed, wherein the different second up-mixing rule is different from the first up-mixing rule, and in which the up-mixer is operative to calculate parameters for the up-mixing rule using the at least two different up-mixing parameters in dependence on the up-mixer mode indication.

21. The multi-channel synthesizer in accordance with claim 20, in which the up-mixer mode indication is operative to sub-band-wise or frame-wise signalling an up-mixer mode.

22. The multi-channel synthesizer in accordance with claim 20, in which the first up-mixing rule is a predictive up-mixing rule and in which a second up-mixing rule is an up-mixing rule having energy-dependent up-mixing parameters.

23. The multi-channel synthesizer in accordance with claim 21, in which the second up-mixing rule is performed as follows:

$$C=\begin{pmatrix}\sqrt{\frac{L}{L+\alpha^2C}} & 0\\ 0 & \sqrt{\frac{R}{R+\alpha^2C}}\\ \sqrt{\frac{C}{L+R+4\alpha^2C}} & \sqrt{\frac{C}{L+R+4\alpha^2C}}\end{pmatrix},$$

wherein L is an energy value of a left input channel, wherein C is an energy value of a centre input channel, wherein R is an energy value of a right input channel, and wherein α is a down-mix determined parameter.

24. The multi-channel synthesizer in accordance with claim 20, in which the second up-mixing rule is so that a right down-mix channel is not added to a left up-mixed channel and vice versa.

25. The multi-channel synthesizer in accordance with claim 20, in which the first up-mixing rule is determined by a wave form matching between wave forms of the original multi-channel signal and wave forms of signals generated by the first up-mixing rule.

26. The multi-channel synthesizer in accordance with claim 20, in which the first up-mixing rule or the different second up-mixing rule is determined as follows:

$$C=\begin{pmatrix}f_1(c_1,c_2)f_2(c_1,c_2)\\ f_2(c_2,c_1)f_1(c_2,c_1)\\ f_3(c_1,c_2)f_3(c_2,c_1)\end{pmatrix},$$

in which function $f_1$, $f_2$, $f_3$ indicate functions of the transmitted two different up-mixing parameters $c_1$, $c_2$, and, in which the functions are determined as follows:

$$f_1(c_1,c_2)=\sqrt{1-c_1^2}$$
$$f_2(c_1,c_2)=0$$
$$f_3(c_1,c_2)=\frac{c_1}{2\alpha},$$

wherein α is a real-valued parameter.

27. The multi-channel synthesizer in accordance with claim 20, further comprising a Spectral Band Replication unit for regenerating a band of the at least one base channel not included in the transmitted base channel using a part of the at least one base channel included in the input signal, and wherein the multi-channel synthesizer is operative to apply the second up-mix rule in a regenerated band of the at least base-channel, and to apply the first up-mixing rule in a band of the base channel, which is included in the input signal.

28. The multi-channel synthesizer in accordance with claim 27, in which the up-mixer mode indication includes Spectral Band Replication information included in the input signal.

29. An encoder for processing a multi-channel input signal, comprising:

an upmixer configured to calculate an up-mixed signal by applying an energy-loss introducing up-mixing operation to at least one base channel derived from the multi-channel input signal;

an energy measure calculator connected to the upmixer and configured to calculate an energy measure depending on an energy difference between a multi-channel input signal or the at least one base channel and the up-mixed signal generated by the upmixer; and an output interface connected to the energy measure calculator and configured to output the energy measure, wherein the at least one base channel is at least one base audio channel, the multi-channel input signal is a multi-channel audio input signal, and the up-mixed signal is an up-mixed audio signal, and wherein at least one of the upmixer, the energy measure calculator and the output interface comprises a hardware implementation.

30. The encoder in accordance with claim 29, in which the energy measure calculator is configured to determine the energy measure based on a relation of an energy of the up-mixed signal, and an energy of the original multi-channel signal, and in which the energy measure calculator is configured to determine scaling factor by inverting the energy measure.

31. The encoder in accordance with claim 29, further comprising a correlation degree calculator configured to determine a degree of correlation, and in which the output interface is operative to output a correlation measure based on the degree of correlation.

32. The encoder in accordance with claim 29, further including an up-mixer parameter calculator configured to calculate at least two different up-mixing parameters, and in which the output interface is operative to output the at least two different up-mixing parameters.

33. The encoder in accordance with claim 29, which further comprises a down-mixer device configured to calculate the at least one base channel, and in which the output interface is operative to output information on a down-mix operation.

34. The encoder in accordance with claim 33, in which the down-mixer device includes a stereo preprocessor, and in which the output interface is operative to output information on the stereo preprocessor.

35. The encoder in accordance with claim 32, in which the up-mixer parameter calculator is configured to perform a parameter optimisation by using wave forms of up-mixed channels, in which the up-mixer parameter calculator is configured to generate at least two up-mixing parameters to be transmitted to a decoder based on optimum up-mixing parameters, and in which the up-mixer parameter calculator is configured to calculate and output the energy measure based on signals generated by up-mixing the at least one base channel using the optimum up-mixing parameters.

36. The encoder in accordance with claim 29, further comprising a parameter generator configured to generate a specific parametric representation among a plurality of different parametric representations based on information available at the encoder;

in which the output interface is configured to output the generated parametric representation and information implicitly or explicitly indicating the specific parameter representation among the plurality of different parameter representations.

37. The encoder in accordance with claim 36, in which the plurality of different parameter representations includes a first parametric representation for a wave form-based predictive up-mixing scheme, and a second parametric representation for a non-wave form-based up-mixing rule.

38. The encoder in accordance with claim 37, in which the non-wave form-based up-mixing rule is an energy-conserving up-mixing rule.

39. The encoder in accordance with claim 36, in which a first parametric representation is a parameter representation, the parameters of which are determined using an optimisation procedure, and in which a second parametric representation is determined by calculating the energies of the original channels and by calculating parameters based on combinations of energies.

40. The encoder in accordance with claim 29, further comprising a spectral band replication module configured to generate spectral band replication side information for at least one band of the original input signal, which is not included in a base channel output by the encoder.

41. A method of generating at least three output channels using an input signal having at least one base channel, the base channel being derived from an original multi-channel signal, comprising:

up-mixing the at least one base channel based on an energy-loss introducing up-mixing rule so that the at least three output channels are obtained, wherein, in the step of upmixing, the at least three output channels are generated in response to an energy measure and at least two different up-mixing parameters so that the at least three output channels have an energy higher than an energy of a signal obtained by only using the energy-loss introducing up-mixing rule instead of an energy error, the energy error depending on the energy-loss introducing up-mixing rule, wherein the at least two different up-mixing parameters and the energy measure for controlling the up-mixer are included in the input signal, and wherein the base channel is a base audio channel and the output channels are output audio channels.

42. A method of processing a multi-channel input signal, comprising:

calculating an up-mixed signal by applying an energy-loss introducing up-mixing operation to at least one base channel derived from the multi-channel input signal;

calculating, by a calendar , an energy measure depending on an energy difference between the multi-channel input signal or the at least one base channel and the up-mixed signal; and outputting, by an output interface connected to the calculator, the energy measure, wherein the at least one base channel is at least one base audio channel, the multi-channel input signal is a multi-channel audio input signal, and the up-mixed signal is an up-mixed audio signal, and wherein at least one of the calculator and the output interface comprises a hardware implementation.

43. A transmitter or audio recorder having an encoder for processing a multi-channel input signal, the encoder comprising:

an upmixer configured to calculate an up-mixed signal by applying an energy-loss introducing up-mixing operation to at least one base channel derived from the multi-channel input signal;

an energy measure calculator to calculate an energy measure depending on an energy difference between a multi-channel input signal or an at least one base channel and the up-mixed signal; and an output interface connected to the energy measure calculator and configured to output the energy measure, wherein the at least one base channel is at least one base audio channel, the multi-channel input signal is a multi-channel audio input signal, and the up-mixed signal is an up-mixed audio signal, and wherein at least one of the energy measure calculator and the output interface comprises a hardware implementation.

44. A receiver or audio player having a multi-channel synthesizer for generating at least three output channels using an input signal having at least one base channel, the base channel being derived from an original multi-channel signal, the multi-channel synthesizer comprising:

an energy provider for providing an energy measure; and an up-mixer for up-mixing the at least one base channel based on an energy-loss introducing up-mixing rule so that the at least three output channels are obtained, wherein the up-mixer is operative to generate the at least three output channels in response to an energy measure provided by an energy measure provider and at least two different up-mixing parameters so that the at least three output channels have an energy higher than an energy of a signal obtained by only using the energy-loss introducing up-mixing rule instead of an energy error, the energy error depending on the energy-loss introducing up-mixing rule, and wherein the at least two different up-mixing parameters and the energy measure for controlling the up-mixer are included in the input signal, wherein the base channel is a base audio channel and the output channels are output audio channels, and wherein at least one of the energy measure provider and the up-mixer comprises a hardware implementation.

45. A transmission system having a transmitter or audio recorder having an encoder for processing a multi-channel input signal, the encoder comprising an energy measure calculator for calculating an energy measure depending on an energy difference between a multi-channel input signal or an at least one base channel derived from the multi-channel input signal and an up-mixed signal generated by an energy-loss introducing up-mixing operation on the at least one base channel; and an output interface for outputting the energy measure, and a receiver or audio player having a multi-channel synthesizer for generating at least three output channels using an input signal having at least one base channel, the base channel being derived from the original multi-channel signal, the multi-channel synthesizer comprising:

an up-mixer for up-mixing the at least one base channel based on an energy-loss introducing up-mixing rule so that the at least three output channels are obtained, wherein the up-mixer is operative to generate the at least three output channels in response to an energy measure and at least two different up-mixing parameters so that the at least three output channels have an energy higher than an energy of a signal obtained by only using the energy-loss introducing up-mixing rule instead of an energy error, the energy error depending on the energy-loss introducing up-mixing rule, and wherein the at least two different up-mixing parameters and the energy measure for controlling the up-mixer are included in the input signal, wherein the base channel is a base audio channel, and the output channels are output audio channels, and wherein at least one of the transmitter or audio recorder, the energy measure calculator, the output interface, the receiver or audio player, and the upmixer comprises a hardware implementation.

46. A method of transmitting or audio recording, the method having a method of processing a multi-channel input signal, comprising:

calculating an up-mixed signal by applying an energy-loss introducing up-mixing operation to at least one base channel derived from the multi-channel input signal;

calculating, by an energy measure calculator, an energy measure depending on an energy difference between the multi-channel input signal or the at least one base channel and the up-mixed signal; and outputting, by an output interface connected to the energy measure calculator, the energy measure, wherein the at least one base channel is at least one base audio channel, the multi-channel input signal is a multi-channel audio input signal, and the up-mixed signal is an up-mixed audio signal, and wherein at least one of the energy measure calculator and the output interface comprises a hardware implementation.

47. A method of receiving or audio playing, the method including a method of generating at least three output channels using an input signal having at least one base channel, the base channel being derived from an original multi-channel signal, comprising:

up-mixing the at least one base channel based on an energy-loss introducing up-mixing rule so that the at least three output channels are obtained, wherein, in the step of upmixing, the at least three output channels are generated in response to an energy measure and at least two different up-mixing parameters so that the at least three output channels have an energy higher than an energy of a signal obtained by only using the energy-loss introducing up-mixing rule instead of an energy error, the energy error depending on the energy-loss introducing up-mixing rule, and wherein the at least two different up-mixing parameters and the energy measure for controlling the up-mixer are included in the input signal, and wherein the base channel is a base audio channel and the output channels are output audio channels.

48. The method of receiving in accordance with claim 47 and transmitting in accordance with claim 46.

49. A non-transitory storage medium having stored thereon a computer program for performing, when running on a computer, a method of generating at least three output channels using an input signal having at least one base channel, the base channel being derived from an original multi-channel signal, comprising:

up-mixing the at least one base channel based on an energy-loss introducing up-mixing rule so that the at least three output channels are obtained, wherein, in the step of upmixing, the at least three output channels are generated in response to an energy measure and at least two different up-mixing parameters so that the at least three output channels have an energy higher than an energy of a signal obtained by only using the energy-loss introducing up-mixing rule instead of an energy error, the energy error depending on the energy-loss introducing up-mixing rule, wherein the at least two different up-mixing parameters and the energy measure for controlling the up-mixer are included in the input signal, and wherein the base channel is a base audio channel and the output channels are output audio channels.

50. A non-transitory storage medium having stored thereon a computer program for performing, when running on a computer, a method of processing a multi-channel input signal, comprising:

calculating an up-mixed signal by applying an energy-loss introducing an up-mixing operation to at least one base channel derived from the multi-channel input signal;

calculating an energy measure depending on an energy difference between the multi-channel input signal or the at least one base channel and the up-mixed signal; and outputting the energy measure, wherein the at least one base channel is at least one base audio channel, the multi-channel input signal is a multi-channel audio input signal, and the up-mixed signal is an up-mixed audio signal.

* * * * *

UNITED STATES PATENT AND TRADEMARK OFFICE
CERTIFICATE OF CORRECTION

PATENT NO. : 8,515,083 B2
APPLICATION NO. : 11/290370
DATED : August 20, 2013
INVENTOR(S) : Lars Falck Villemoes et al.

It is certified that error appears in the above-identified patent and that said Letters Patent is hereby corrected as shown below:

In The Claims

In claim 2, line 41 of column 24, “up-mix” should read --up-mixing--.

In claim 6, line 67 of column 24, “up-mix” should read --up-mixing--.

In claim 6, line 3 of column 25, “base channel” should read --one base channel--.

In claim 7, lines 17 and 19 of column 25, “up-mix” should read --up-mixing--.

In claim 7, line 17 of column 25, “and wherein $\|\hat{Z}\|$ represents” should read --and wherein $\|\hat{z}\|$ represents--.

In claim 8, line 24 of column 25, “at least one the output signals” should read --at least one output signal--.

In claim 9, lines 32 and 33 of column 25, “to generate a de-correlation signal” should read --to generate the de-correlated signal--.

In claim 16, line 25 of column 26, “the de-correlation information” should read --a de-correlation information--.

In claim 24, line 16 of column 27, “in which the second up-mixing rule” should read --in which the different second up-mixing rule--.

In claim 27, line 53 of column 27, “to apply the second up-mix rule” should read --to apply the different second up-mixing rule--.

In claim 29, line 3 of column 28, “a multi-channel input signal” should read --the multi-channel input signal--.

In claim 30, line 21 of column 28, “to determine scaling factor” should read --to determine a scaling factor--.

In claim 42, line 43 of column 29, “by a calendar” should read --by a calculator--.

In claim 43, line 62 of column 29, “an energy measure calculator to calculate” should read --an energy measure calculator configured to calculate--.

In claim 43, lines 63 and 64 of column 29, “between a multi-channel input signal or an at least one base channel” should read --between the multi-channel input signal or the at least one base channel--.

In claim 44, line 13 of column 30, “an energy provider” should read --an energy measure provider--.

In claim 45, lines 49/50 of column 30, “from the original multi-channel signal” should read --from an original multi-channel signal--.

Signed and Sealed this
Ninth Day of August, 2016

Michelle K. Lee
*Director of the United States Patent and Trademark Office*

In claim 45, line 53 of column 30, “based on an energy loss” should read --based on the energy loss--.
In claim 45, line 56 of column 30, “in response to an energy measure” should read --in response to the energy measure--.
In claim 50, line 32 of column 32, “introducing an up-mixing operation” should read --introducing up-mixing operation--.